US012185058B2

(12) United States Patent
Nishiura

(10) Patent No.: US 12,185,058 B2
(45) Date of Patent: Dec. 31, 2024

(54) PARAMETRIC ARRAY LOUDSPEAKER, SIGNAL PROCESSING DEVICE, AND SIGNAL PROCESSING METHOD

(71) Applicant: The Ritsumeikan Trust, Kyoto (JP)

(72) Inventor: Takanobu Nishiura, Shiga (JP)

(73) Assignee: THE RITSUMEIKAN TRUST, Kyoto (JP)

( * ) Notice: Subject to any disclaimer, the term of this patent is extended or adjusted under 35 U.S.C. 154(b) by 0 days.

(21) Appl. No.: 18/007,855

(22) PCT Filed: Feb. 25, 2022

(86) PCT No.: PCT/JP2022/007867
§ 371 (c)(1),
(2) Date: Dec. 2, 2022

(87) PCT Pub. No.: WO2022/254830
PCT Pub. Date: Dec. 8, 2022

(65) Prior Publication Data
US 2024/0236558 A1 Jul. 11, 2024

(30) Foreign Application Priority Data
Jun. 1, 2021 (JP) ................................ 2021-092599

(51) Int. Cl.
*H04R 1/40* (2006.01)
*H04R 5/02* (2006.01)

(52) U.S. Cl.
CPC ......... *H04R 1/403* (2013.01); *H04R 2430/20* (2013.01)

(58) Field of Classification Search
CPC ..................................................... H04R 1/403
(Continued)

(56) References Cited

U.S. PATENT DOCUMENTS 10,750,275 B2 8/2020 Tanaka
2019/0124439 A1* 4/2019 Tanaka ................ G10K 11/346

FOREIGN PATENT DOCUMENTS

JP 2004349816 A 12/2004
JP 2013021448 A 1/2013
(Continued)

OTHER PUBLICATIONS

Maekawa et al. "Out-of-phase driving for parametric loudspeaker" Sep. 2009—Lecture proceedings of 2009 Autumn Meeting of the Acoustical Society of Japan ; pp. 677-678.
(Continued)

*Primary Examiner* — Ammar T Hamid
(74) *Attorney, Agent, or Firm* — Millen, White, Zelano & Branigan P.C.; William F. Nixon

(57) ABSTRACT

A parametric array loudspeaker 10 includes: a plurality of ultrasonic wave generating elements 23A, 23B arranged in a first direction R1; and a modulation circuit 32 configured to generate a modulation signal in which audible sound is modulated with a carrier wave. The plurality of ultrasonic wave generating elements include a first ultrasonic wave generating element 23A included in a first area being at least one side of both end areas in the first direction, and a second ultrasonic wave generating element 23B included in a second area present between the both end areas. The modulation circuit generates a first modulation signal SG1 to be provided to the first ultrasonic wave generating element and a second modulation signal SG2 to be provided to the second ultrasonic wave generating element. The first modulation signal is a signal in which the phase of at least one of the carrier wave and a sideband wave of the second modulation signal is shifted by a predetermined phase shift amount.

6 Claims, 25 Drawing Sheets

(58) Field of Classification Search
USPC .................................................... 381/97, 300
See application file for complete search history.

(56) References Cited

FOREIGN PATENT DOCUMENTS

| | | |
|---|---|---|
| JP | 2017092531 A | 5/2017 |
| JP | 2019080172 A | 5/2019 |

OTHER PUBLICATIONS

English translation of International Search report PCT/JP2022/007867 dated May 24, 2022 (pp. 1-2).

* cited by examiner

FIG.11

| CONDITION | DIRECTIVITY ANGLE @1 m [deg] | DIRECTIVITY ANGLE @2 m [deg] | MAXIMUM SOUND PRESSURE [dB] | MAXIMUM SOUND PRESSURE DISTANCE [m] | SOUND PRESSURE ATTENUATION [dB] 0.5 →2.5m | SOUND PRESSURE ATTENUATION [dB] 0.5 →3.5m |
|---|---|---|---|---|---|---|
| 1 | 7.4 | 7.2 | 71.2 | 1.00 | 3.88 | 6.94 |
| 2 | 8.1 | 9.4 | 71.3 | 1.00 | 4.74 | 7.58 |
| 3 | 8.3 | 9.5 | 71.5 | 0.75 | 4.98 | 7.72 |
| 4 | 8.2 | 7.7 | 72.0 | 1.00 | 3.24 | 6.13 |
| 5 | 7.9 | 8.1 | 71.6 | 1.00 | 4.10 | 6.95 |

FIG.18

| CONDITION | DIRECTIVITY ANGLE @1 m [deg] | DIRECTIVITY ANGLE @2 m [deg] | MAXIMUM SOUND PRESSURE [dB] | MAXIMUM SOUND PRESSURE DISTANCE [m] | SOUND PRESSURE ATTENUATION [dB] 0.5 →2.5m | SOUND PRESSURE ATTENUATION [dB] 0.5 →3.5m |
|---|---|---|---|---|---|---|
| 7 | 7.1 | 7.2 | 70.5 | 0.75 | 4.79 | 7.79 |
| 8 | 9.3 | 10.7 | 70.3 | 0.75 | 5.68 | 8.32 |
| 9 | 9.0 | 10.6 | 71.0 | 0.75 | 5.82 | 8.43 |
| 10 | 8.2 | 7.6 | 72.1 | 1.00 | 3.34 | 6.06 |
| 11 | 8.2 | 8.6 | 70.9 | 1.00 | 4.69 | 7.68 |

FIG.25

| CONDITION | DIRECTIVITY ANGLE @1 m [deg] | DIRECTIVITY ANGLE @2 m [deg] | MAXIMUM SOUND PRESSURE [dB] | MAXIMUM SOUND PRESSURE DISTANCE [m] | SOUND PRESSURE ATTENUATION [dB] 0.5 →2.5m | SOUND PRESSURE ATTENUATION [dB] 0.5 →3.5m |
|---|---|---|---|---|---|---|
| 13 | 7.0 | 6.7 | 68.1 | 0.75 | 5.97 | 8.74 |
| 14 | 12.5 | 14.4 | 67.5 | 0.75 | 7.14 | 9.90 |
| 15 | 11.5 | 14.0 | 69.8 | 0.75 | 6.96 | 9.47 |
| 16 | 8.2 | 7.5 | 72.2 | 1.00 | 3.46 | 6.16 |
| 17 | 8.9 | 9.6 | 69.0 | 0.75 | 5.23 | 7.91 |

PARAMETRIC ARRAY LOUDSPEAKER, SIGNAL PROCESSING DEVICE, AND SIGNAL PROCESSING METHOD

TECHNICAL FIELD

The present disclosure relates to a parametric array loudspeaker, a signal processing device, and a signal processing method. This application claims priority on Japanese Patent Application No. 2021-092599 filed on Jun. 1, 2021, the entire content of which is incorporated herein by reference.

BACKGROUND ART

To date, parametric array loudspeakers that realize high directivity by using an ultrasonic wave have been known (see PATENT LITERATURE 1, for example). Such a parametric array loudspeaker radiates a modulated wave obtained by modulating a carrier wave in an ultrasonic wave band with a sound signal, and allows self-demodulation of the modulated wave according to nonlinear characteristics in the air, thereby transmitting sound. The audible area according to the parametric array loudspeaker is linearly present due to high directivity of the modulated wave (ultrasonic wave). Therefore, the sound can be delivered only to a person present in the linear audible area.

CITATION LIST

Patent Literature

PATENT LITERATURE 1: Japanese Laid-Open Patent Publication No. 2004-349816

SUMMARY OF INVENTION

Regarding the parametric array loudspeaker, there is a desire to deliver sound to a more limited range. Thus, an object of the present disclosure is to provide a parametric array loudspeaker, a signal processing device, and a signal processing method that can change the range in which audible sound is delivered.

According to a certain embodiment, a parametric array loudspeaker includes: a plurality of ultrasonic wave generating elements arranged in a first direction; and a modulation circuit configured to generate a modulation signal in which audible sound is modulated with a carrier wave. The plurality of ultrasonic wave generating elements include a first ultrasonic wave generating element included in a first area being at least one side of both end areas in the first direction, and a second ultrasonic wave generating element included in a second area present between the both end areas. The modulation circuit generates a first modulation signal to be provided to the first ultrasonic wave generating element, and a second modulation signal to be provided to the second ultrasonic wave generating element. The first modulation signal is a signal in which a phase of at least one of the carrier wave and a sideband wave of the second modulation signal is shifted by a predetermined phase shift amount.

According to a certain embodiment, a signal processing device is a signal processing device to be used in a parametric array loudspeaker including a plurality of ultrasonic wave generating elements arranged in a first direction, and configured to generate a modulation signal in which audible sound is modulated with a carrier wave. The signal processing device is configured to: generate a first modulation signal to be provided to a first ultrasonic wave generating element, out of the plurality of ultrasonic wave generating elements, that is included in a first area being at least one side of both end areas in the first direction; and generate a second modulation signal to be provided to a second ultrasonic wave generating element included in a second area present between the both end areas. The first modulation signal is a signal in which a phase of at least one of the carrier wave and a sideband wave of the second modulation signal is shifted by a predetermined phase shift amount.

According to a certain embodiment, a signal processing method is a signal processing method to be performed in a parametric array loudspeaker including a plurality of ultrasonic wave generating elements arranged in a first direction. The signal processing method is for generating a modulation signal in which audible sound is modulated with a carrier wave. The signal processing method includes: generating a first modulation signal to be provided to a first ultrasonic wave generating element, out of the plurality of ultrasonic wave generating elements, that is included in a first area being at least one side of both end areas in the first direction; and generating a second modulation signal to be provided to a second ultrasonic wave generating element included in a second area present between the both end areas. The first modulation signal is a signal in which a phase of at least one of the carrier wave and a sideband wave of the second modulation signal is shifted by a predetermined phase shift amount.

More details will be described in an embodiment described later.

BRIEF DESCRIPTION OF DRAWINGS

FIG. 11 shows results under condition 1 to condition 5 in the first experiment in the verification experiment of the parametric array loudspeaker according to the embodiment.

FIG. 18 shows results under condition 7 to condition 11 in the second experiment in the verification experiment of the parametric array loudspeaker according to the embodiment.

FIG. 25 shows results under condition 13 to condition 17 in the third experiment in the verification experiment of the parametric array loudspeaker according to the embodiment.

DESCRIPTION OF EMBODIMENTS

Figure 1:
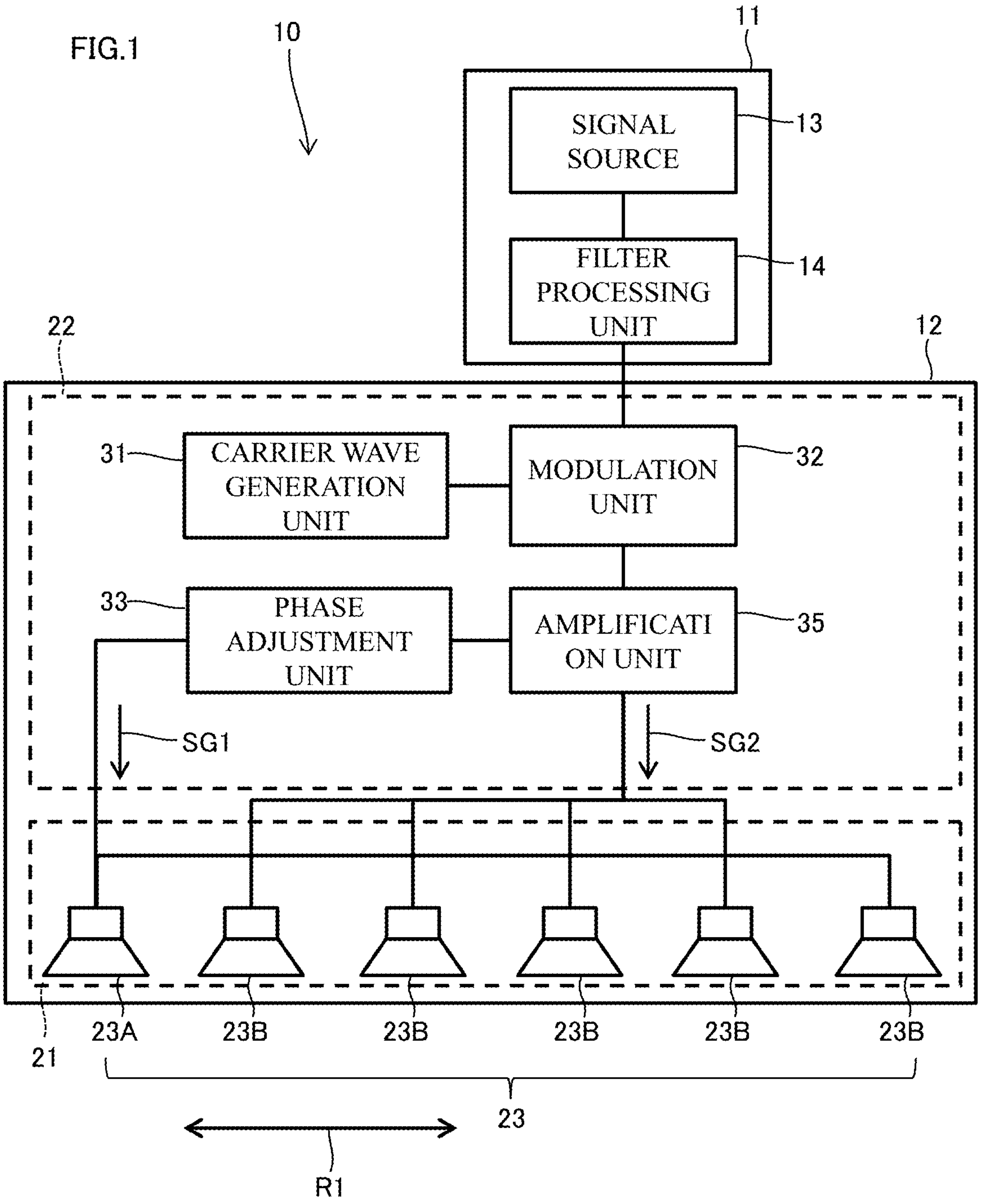
FIG. 1 is a schematic configuration diagram of an acoustic sound system including a parametric array loudspeaker according to an embodiment.

1. Outline of Parametric Array Loudspeaker, Signal Processing Device, and Signal Processing Method (1) A parametric array loudspeaker according to an embodiment includes: a plurality of ultrasonic wave generating elements arranged in a first direction: and a modulation circuit configured to generate a modulation signal in which audible sound is modulated with a carrier wave. The plurality of ultrasonic wave generating elements include a first ultrasonic wave generating element included in a first area being at least one side of both end areas in the first direction, and a second ultrasonic wave generating element included in a second area present between the both end areas. The modulation circuit generates a first modulation signal to be provided to the first ultrasonic wave generating element, and a second modulation signal to be provided to the second ultrasonic wave generating element. The first modulation signal is a signal in which a phase of at least one of the carrier wave and a sideband wave of the second modulation signal is shifted by a predetermined phase shift amount.

The first modulation signal may be a signal in which the phase of only the sideband wave of the second modulation signal is shifted. The inventor has verified by performing an experiment that this makes it possible to narrow the width in the first direction of the audible area obtained through self-demodulation of the modulated wave radiated from the parametric array loudspeaker.

The first modulation signal may be a signal in which the phase of only the carrier wave of the second modulation signal is shifted. The inventor has verified by performing an experiment that this makes it possible to shorten the length in the second direction orthogonal to the first direction of the audible area, i.e., the distance reached by the audible sound.

The first modulation signal may be a signal in which the phases of the carrier wave and the carrier wave of the second modulation signal are shifted. The inventor has verified by performing an experiment that this makes it possible to narrow the width in the first direction of the audible area, and at the same time to shorten the length in the second direction orthogonal to the first direction, i.e., the distance reached by the audible sound.

Therefore, the range in which the audible sound is delivered can be changed by the parametric array loudspeaker that uses, as the first modulation signal, a signal in which the phase of at least one of the carrier wave and the sideband wave of the second modulation signal is shifted by a predetermined phase shift amount.

(2) Preferably, generating the second modulation signal by the modulation circuit includes inverting the phase of the carrier wave of the first modulation signal, and not changing the phase of the sideband wave. Since the phase of the carrier wave of the first modulation signal and the phase of the carrier wave of the second modulation signal are shifted, it is considered that, in the vicinity of the boundary between the modulated wave radiated from the first ultrasonic wave generating element and the modulated wave radiated from the second ultrasonic wave generating element, the respective radiation waves cancel each other, whereby the width in the first direction of the audible area can be made smaller. Therefore, the radiation waves cancel each other more due to the inversion of the phase of the carrier wave, whereby the width in the first direction of the audible area can be made smaller.

(3) Preferably, generating the second modulation signal by the modulation circuit includes inverting the phase of the sideband wave of the first modulation signal and not changing the phase of the carrier wave. Since the phase of the sideband wave of the first modulation signal and the phase of the sideband wave of the second modulation signal are shifted, the number of the ultrasonic wave generating elements that radiate the modulated wave of the second modulation signal is reduced. As a result, the distance reached by the audible sound is considered to be shortened. Therefore, due to the inversion of the phase of the sideband wave, the number of the ultrasonic wave generating elements that radiate the modulated wave of the second modulation signal is more reduced, whereby the distance reached by the audible sound can be more shortened.

(4) Preferably, generating the second modulation signal by the modulation circuit includes inverting the phases of both of the sideband wave and the carrier wave of the first modulation signal. Accordingly, when the distance reached by the audible sound is to be shortened by inverting the phase of the sideband wave of the modulated wave, if further, with respect to the ultrasonic wave generating elements at both ends in the first direction, the phase of the carrier wave of the modulated wave is inverted, sound can be delivered more sharply and in a narrower manner with respect to the first direction.

(5) A signal processing device according to the embodiment is a signal processing device to be used in a parametric array loudspeaker including a plurality of ultrasonic wave generating elements arranged in a first direction, and configured to generate a modulation signal in which audible sound is modulated with a carrier wave. The signal processing device is configured to: generate a first modulation signal to be provided to a first ultrasonic wave generating element, out of the plurality of ultrasonic wave generating elements, that is included in a first area being at least one side of both end areas in the first direction: and generate a second modulation signal to be provided to a second ultrasonic wave generating element included in a second area present between the both end areas. The first modulation signal is a signal in which a phase of at least one of the carrier wave and a sideband wave of the second modulation signal is shifted by a predetermined phase shift amount. Accordingly, the range in which the audible sound is delivered can be changed by the parametric array loudspeaker.

(6) A signal processing method according to the embodiment is a signal processing method to be performed in a parametric array loudspeaker including a plurality of ultrasonic wave generating elements arranged in a first direction. The signal processing method is for generating a modulation signal in which audible sound is modulated with a carrier wave. The signal processing method includes: generating a first modulation signal to be provided to a first ultrasonic wave generating element, out of the plurality of ultrasonic wave generating elements, that is included in a first area being at least one side of both end areas in the first direction: and generating a second modulation signal to be provided to a second ultrasonic wave generating element included in a second area present between the both end areas. The first modulation signal is a signal in which a phase of at least one of the carrier wave and a sideband wave of the second modulation signal is shifted by a predetermined phase shift amount. Accordingly, the range in which the audible sound is delivered can be changed by the parametric array loudspeaker.

2. Example of Parametric Array Loudspeaker, Signal Processing Device, and Signal Processing Method FIG. 1 is a schematic configuration diagram of an acoustic sound system 10 including a parametric array loudspeaker according to an embodiment. With reference to FIG. 1, the acoustic sound system 10 includes a signal generation device 11 and a parametric array loudspeaker 12.

The signal generation device 11 includes a signal source 13 and a filter processing unit 14. The signal source 13 generates a sound wave signal in an audible band such as a sound signal or an audio signal, and outputs the sound wave signal to the filter processing unit 14. The filter processing unit 14 imparts a predetermined characteristic to the signal wave, and then outputs the signal wave to the parametric array loudspeaker 12.

The parametric array loudspeaker 12 includes a loudspeaker body 21 and a signal processing unit 22. The signal processing unit 22 may be mounted, together with the loudspeaker body 21, to a single device. Alternatively, the signal processing unit 22 may be configured as a signal processing device different from the loudspeaker body 21, such that the signal processing unit 22 is connected to the loudspeaker body 21 in a wired or wireless manner, to transmit a generated signal to the loudspeaker body 21. The signal processing unit 22 as a signal processing device may be realized by a computer, for example. The computer may be a smartphone, for example.

Figure 2:
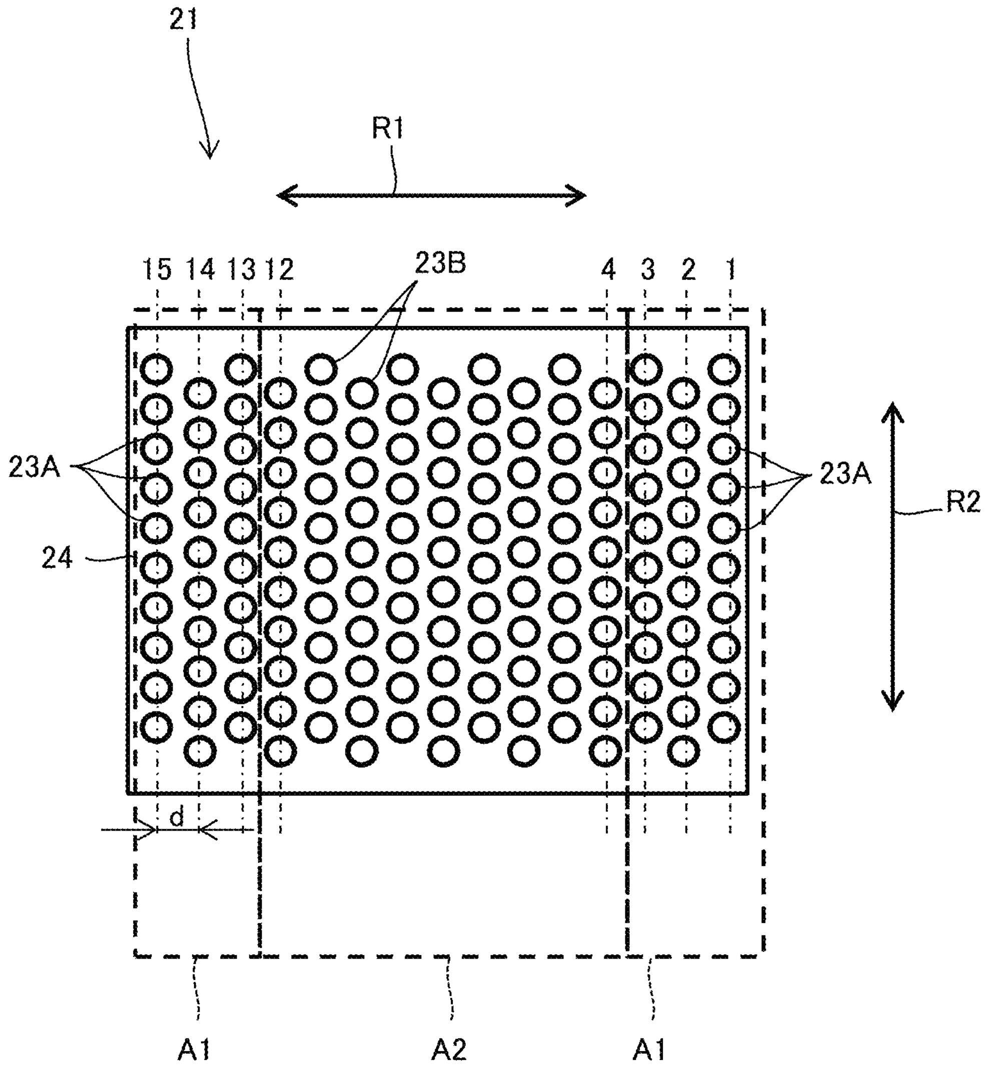
FIG. 2 is a front explanatory drawing of a loudspeaker body.

FIG. 2 is a front explanatory drawing of the loudspeaker body 21. The loudspeaker body 21 includes a plurality of ultrasonic wave generating elements 23 which each radiate an ultrasonic wave. The plurality of ultrasonic wave generating elements 23 are arranged, on a support substrate 24, by a number of N (N is plural) in a first direction R1, which corresponds to the left-right direction in FIG. 2. In FIG. 2, 15 (N=15) ultrasonic wave generating elements 23 are disposed in the first direction R1 at an interval d.

Preferably, further, the plurality of ultrasonic wave generating element 23 are arranged by a plural number also in a second direction R2, which is orthogonal to the first direction R1 and which corresponds to the up-down direction in FIG. 2. In FIG. 2, 10 ultrasonic wave generating elements 23 are disposed in the second direction R2. That is, preferably, the plurality of ultrasonic wave generating elements 23 are provided in a state of being arrayed in a planar shape on the support substrate 24. In FIG. 2, the ultrasonic wave generating elements 23 are disposed vertically by a number of 10 and horizontally in 15 columns.

The plurality of ultrasonic wave generating elements 23 arranged in the first direction R1 include: first ultrasonic wave generating elements 23A included in a first area A1 being at least one side of both end areas in the first direction R1: and second ultrasonic wave generating elements 23B included in a second area A2 present between the both end areas. As an example, both of the both end areas in the first direction R1 is defined as the first area A1.

Specifically, in the example in FIG. 2, out of 15 columns in the left-right direction, the ultrasonic wave generating elements in the three columns at each of both ends at the left and right are defined as the first ultrasonic wave generating elements 23A, and the ultrasonic wave generating elements in the plurality of columns on the inner side thereof are defined as the second ultrasonic wave generating elements 23B. When the column numbers are defined as 1 to 15 from the right in order, the ultrasonic wave generating elements 23 disposed in the first to third columns, and the 13th to 15th columns are defined as the first ultrasonic wave generating elements 23A, and the ultrasonic wave generating elements 23 disposed in the fourth to 12th columns are defined as the second ultrasonic wave generating elements 23B. In FIG. 1, schematically, one column is represented by one ultrasonic wave generating element 23, and one ultrasonic wave generating element 23 at each of the left and right is indicated as the first ultrasonic wave generating element 23A, and the plurality of ultrasonic wave generating elements 23 on the inner side thereof are indicated as the second ultrasonic wave generating elements 23B.

Figure 3:
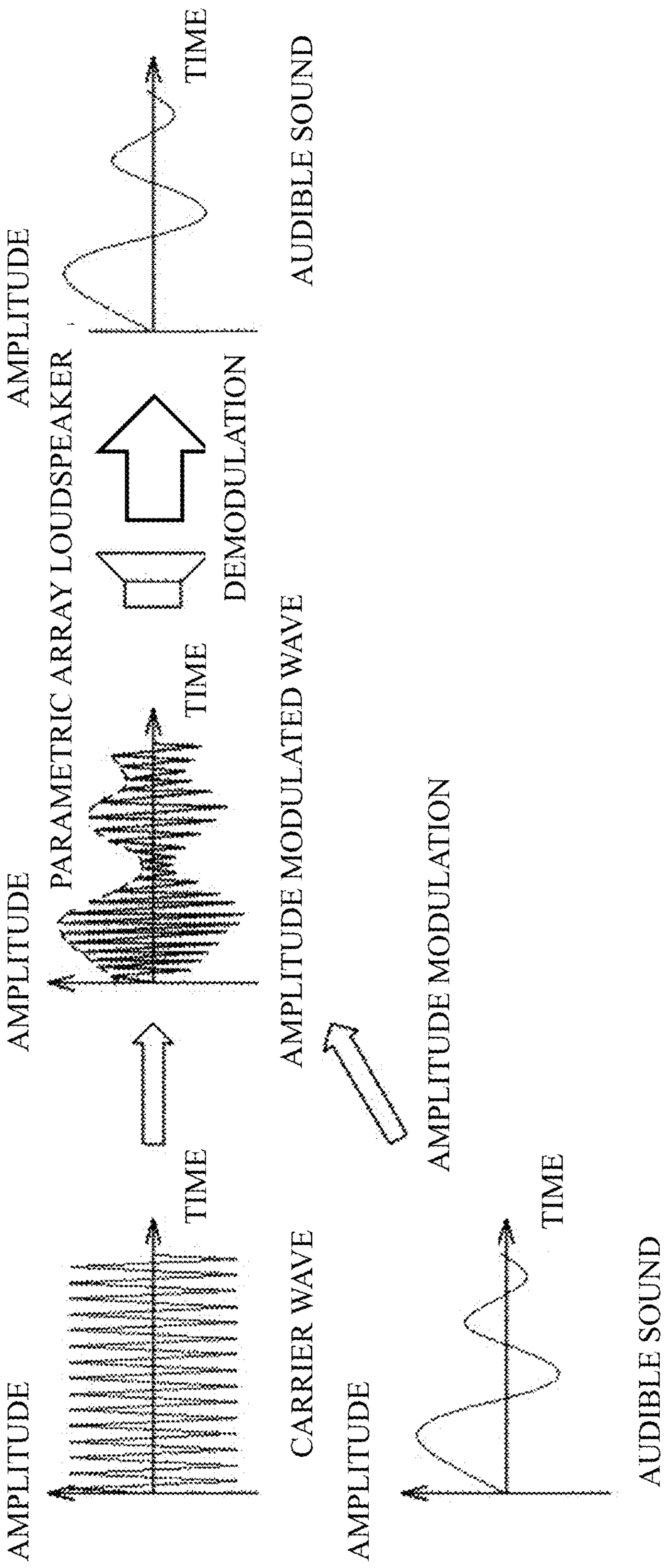
FIG. 3 is an explanatory drawing showing a principle of the parametric array loudspeaker.

FIG. 3 is an explanatory drawing showing the principle of the parametric array loudspeaker 12. The parametric array loudspeaker 12 generates, as a carrier wave, an ultrasonic wave at a high frequency not less than 20 kHz that a human cannot perceive as sound, and radiates into the air a modulated wave generated by performing amplitude modulation on the carrier wave with a sound wave signal which is an audible sound generated by the signal generation device 11. The modulated wave having been radiated is distorted due to nonlinearity of air in the course of propagation in the air, and due to this distortion, the audible sound is self-demodulated.

The signal processing unit 22 includes a carrier wave generation unit 31, a modulation unit 32, and an amplification unit 35. The signal processing unit 22 generates a first modulation signal SG1 to be provided to each first ultrasonic wave generating element 23A, and a second modulation signal SG2 to be provided to each second ultrasonic wave generating element 23B.

The carrier wave generation unit 31 generates a carrier wave composed of an ultrasonic wave having a predetermined frequency, and outputs the carrier wave to the modulation unit 32. The carrier wave generation unit 31 is configured to include a high-frequency oscillator using a quartz oscillator or the like, for example. In the present embodiment, the carrier wave generation unit 31 generates a carrier wave of 40 kHz and outputs the carrier wave to the modulation unit 32.

The modulation unit 32 generates an amplitude modulated wave by performing amplitude modulation, with the sound wave signal inputted from the signal generation device 11, on the carrier wave inputted from the carrier wave generation unit 31. The amplification unit 35 is implemented by an operational amplifier or the like having a good amplification characteristic for an ultrasonic wave band, for example. The amplification unit 35 amplifies the modulated wave generated by the modulation unit 32.

Specifically, a carrier wave vc(t) can be represented by the following formula (1) by using a frequency fc of the carrier wave, a time t, and a maximum amplitude Ac of the carrier wave. An audible sound vs(t) can be represented by the following formula (2) by using a frequency fs of the sound wave signal generated by the signal generation device 11, and a maximum amplitude As of the audible sound.

$$vc(t) = Ac \cdot \cos(2\pi fct) \qquad \text{formula (1)}$$

$$vs(t) = As \cdot \cos(2\pi fst) \qquad \text{formula (2)}$$

The modulation unit 32 performs amplitude modulation, with the audible sound vs(t), on the carrier wave vc(t). A modulated wave $v_M(t)$ generated by the modulation unit 32 can be represented by the following formula (3), by using a degree of modulation m (m≤1) indicating the content amount of the audible sound.

The degree of modulation m can be represented by the following formula (4).

$$v_M(t) = (1 + m \cdot vs(t))vs(t)) \qquad \text{formula (3)}$$

$$m = As/Ac \qquad \text{formula (4)}$$

From formula (3), the modulated wave $v_M(t)$ can be represented by the following formula (5).

$$v_M(t) = vc(t) + m \cdot vs(t) \cdot vc(t) \qquad \text{formula (5)}$$

From formula (5), it is understood that the modulated wave $v_M(t)$ is composed of the carrier wave vc(t) and a sideband wave m·vs(t)·vc(t). The sideband wave m·vs(t)·vc (t) may be both of: a sideband wave having a frequency (fc+fs) being the sum of the frequency fc of the carrier wave and the frequency fs of the sound wave signal of the audible sound; and a sideband wave having a frequency (fc−fs) being the difference between the frequency fc of the carrier wave and the frequency fs of the sound wave signal, or may be one of these obtained through removal with use of a filter or the like. When such a modulated wave $v_M(t)$ is radiated at a large sound pressure into air from the parametric array loudspeaker 12, the modulated wave is distorted due to the nonlinearity of air, and a difference tone between the carrier wave and the sideband wave is reproduced as audible sound.

The modulated wave amplified by the amplification unit 35 is passed, as the second modulation signal SG2, to each second ultrasonic wave generating element 23B. Meanwhile, the modulated wave amplified by the amplification unit 35 is also passed to a phase adjustment unit 33. The phase adjustment unit 33 adjusts the phase of the modulated wave to generate the first modulation signal SG1, and passes the first modulation signal SG1 to each first ultrasonic wave generating element 23A.

The phase adjustment unit 33 shifts, by a predetermined phase shift amount, the phase of at least one of the carrier wave and the sideband wave of the second modulation signal SG2, to generate the first modulation signal SG1. That is, the first modulation signal SG1 is a signal in which the phase of at least one of the carrier wave and the sideband wave of the second modulation signal SG2, i.e., the modulated wave having been amplified, is shifted by the predetermined phase shift amount.

The phase adjustment unit 33 may be realized by a phase shifter including a temporary phase-shift circuit, which is also referred to as an all-pass filter. As another example, the phase adjustment unit 33 may be realized by phase processing performed by a computer.

Preferably, the predetermined phase shift amount is a shift amount that causes inversion of the phase. Thus, the first modulation signal SG1 is a signal obtained by inverting the phase of at least one of the carrier wave and the sideband wave of the second modulation signal SG2. In order to invert the phase, the predetermined phase shift amount is preferably 180°, without being limited in particular, and may be in a range of 90° to 270°, for example. As another example, in order to invert the phase, the predetermined phase shift amount may be in a range of 135° to 225°.

As an example, the phase adjustment unit 33 generates a signal in which the phase of the carrier wave of the second modulation signal SG2 is inverted and the phase of the sideband wave thereof is not changed, and uses this signal as the first modulation signal SG1. A modulated wave $v_M\mathbf{1}(t)$ of this case can be represented by the following formula (6) on the basis of formula (5).

$$v_M1(t) = -vc(t) + m \cdot vs(t) \cdot vc(t) \qquad \text{formula (6)}$$

As another example, the phase adjustment unit 33 generates a signal in which the phase of the sideband wave of the second modulation signal SG2 is inverted and the phase of the carrier wave thereof is not changed, and uses this signal as the first modulation signal SG1. A modulated wave ${}_M\mathbf{2}(t)$ of this case can be represented by the following formula (7) on the basis of formula (5).

$$v_M2(t) = vc(t) - m \cdot vs(t) \cdot vc(t) \qquad \text{formula (7)}$$

As another example, the phase adjustment unit 33 generates a signal in which the phases of both of the sideband wave and the carrier wave of the second modulation signal SG2 are inverted, and uses this signal as the first modulation signal SG1. A modulated wave ${}_M\mathbf{3}(t)$ of this case can be represented by the following formula (8) on the basis of formula (5).

$$v_M3(t) = -vc(t) - m \cdot vs(t) \cdot vc(t) \quad \text{formula (8)}$$

Figure 4:
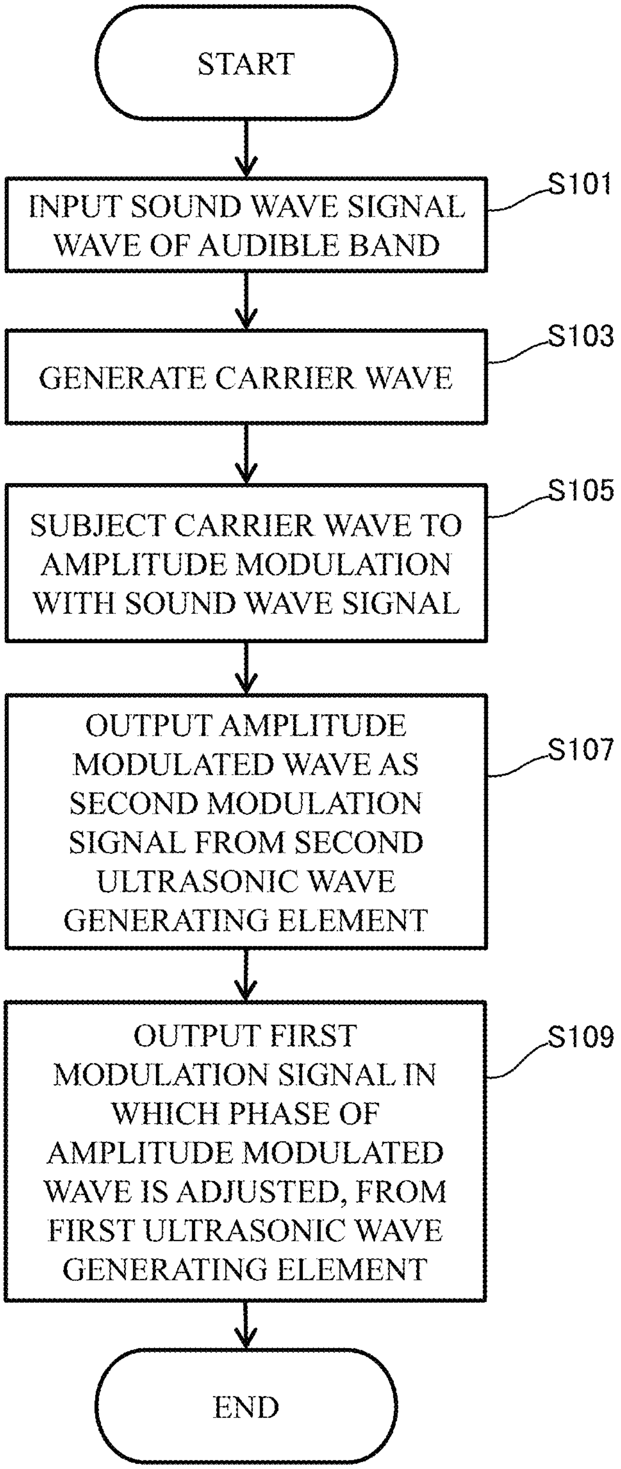
FIG. 4 is a flowchart showing an example of a signal processing method according to the embodiment.

FIG. 4 is a flowchart showing an example of a signal processing method according to the embodiment. With reference to FIG. 4, a sound wave signal wave in an audible band generated by the signal generation device 11 is inputted to the signal processing unit 22 (step S101).

In the signal processing unit 22, a carrier wave of 40 kHz is generated (step S103). The carrier wave is subjected to amplitude modulation with the sound wave signal inputted from the signal generation device 11 (step S105). The amplitude modulated wave generated in step S105 is outputted, as the second modulation signal SG2, to each second ultrasonic wave generating element 23B (step S107).

In the signal processing unit 22, the first modulation signal SG1 is generated by inverting the phase of at least one of the carrier wave and the sideband wave of the amplitude modulated wave, and the first modulation signal SG1 is passed to each first ultrasonic wave generating element 23A (step S109).

A verification experiment was performed in order to verify influence on radiation characteristics of the parametric array loudspeaker 12, with respect to the signals generated by the signal processing method according to the embodiment. In the verification experiment, the parametric array loudspeaker 12 in which the ultrasonic wave generating elements 23 were disposed vertically by a number of 10 and horizontally in 15 columns shown in FIG. 2 was used.

The influence on the radiation characteristics was measured in terms of the sound pressure level, the directivity angle, and the attenuation amount of sound pressure. The measurement result of the sound pressure level was obtained by: recording, by a plurality of microphones, a sound wave (modulated wave) radiated from the parametric array loudspeaker 12: calculating the sound pressure level of the audible sound having been recorded; and obtaining the distribution thereof. As an example, the microphones were disposed vertically and horizontally by predetermined numbers at a predetermined interval (e.g., an interval of 0.1 m), and the loudspeaker body 21 of the parametric array loudspeaker 12 was disposed at a position (coordinates (0,0)) where the width and the depth (distance) were 0 m.

The directivity angle is the angle in which the ultrasonic wave spreads. The inventor measured the directivity angle (directivity angle at 1 m) at a position separated by 1 m from the loudspeaker body 21, and the directivity angle (directivity angle at 2 m) at a position separated by 2 m from the loudspeaker body 21. A larger value of the directivity angle indicates that the audible area is wider, i.e., sound is delivered to a wide range. A smaller value of the directivity angle indicates that the audiovisual area is narrower, i.e., sound is delivered to a narrow range.

The sound pressure attenuation amount is the attenuation amount of the sound pressure at a predetermined distance. The inventor measured the attenuation amount (0.5-to-2.5 m sound pressure attenuation amount) of the sound pressure from a position separated by 0.5 m from the loudspeaker body 21 to a position separated by 2.5 m therefrom, and the attenuation amount (0.5-to-3.5 m sound pressure attenuation amount) of the sound pressure from a position separated by 0.5 m from the loudspeaker body 21 to a position separated by 3.5 m therefrom. A smaller value of the sound pressure attenuation amount indicates that the distance from the parametric array loudspeaker 12 of the audible area is longer, i.e., sound is delivered farther, and a larger value of the sound pressure attenuation amount indicates that the distance from the parametric array loudspeaker 12 of the audible area is longer, i.e., the distance in which sound is delivered is shorter.

In a first experiment, the ultrasonic wave generating elements 23 disposed in one column at each of the left and right in the loudspeaker body 21, i.e., the first column and the 15th column, were defined as the first ultrasonic wave generating elements 23A, and the ultrasonic wave generating elements 23 disposed in the second to 14th columns were defined as the second ultrasonic wave generating elements 23B. In that state, the inventor measured the sound pressure level, the directivity angle, and the sound pressure attenuation amount with respect to each of conditions 1 to 3 below.

Condition 1: the first modulation signal SG1 is a signal ($v_M$1($t$) of formula (6)) in which the phase of the carrier wave of the second modulation signal SG2 is inverted and the phase of the sideband wave thereof is not changed.

Condition 2: the first modulation signal SG1 is a signal ($v_M$2($t$) of formula (7)) in which the phase of the sideband wave of the second modulation signal SG2 is inverted and the phase of the carrier wave thereof is not changed.

Condition 3: the first modulation signal SG1 is a signal ($v_M$3($t$) of formula (8)) in which the phases of both of the sideband wave and the carrier wave of the second modulation signal SG2 are inverted.

In addition, as a comparative experiment, the inventor performed an experiment in which, by using the same parametric array loudspeaker 12, only the second modulation signal SG2 in which the phases of neither the carrier wave nor the sideband wave were changed was outputted, and the inventor measured the sound pressure level, the directivity angle, and the sound pressure attenuation amount also with respect to each of conditions 4 to 6 below.

Condition 4: the second modulation signal SG2 is used as the modulation signal for all of the first ultrasonic wave generating elements 23A and the second ultrasonic wave generating elements 23B.

Condition 5: the second modulation signal SG2 is used only for the second ultrasonic wave generating elements 23B.

Condition 6: the second modulation signal SG2 is used only for the first ultrasonic wave generating elements 23A.

Figure 5:
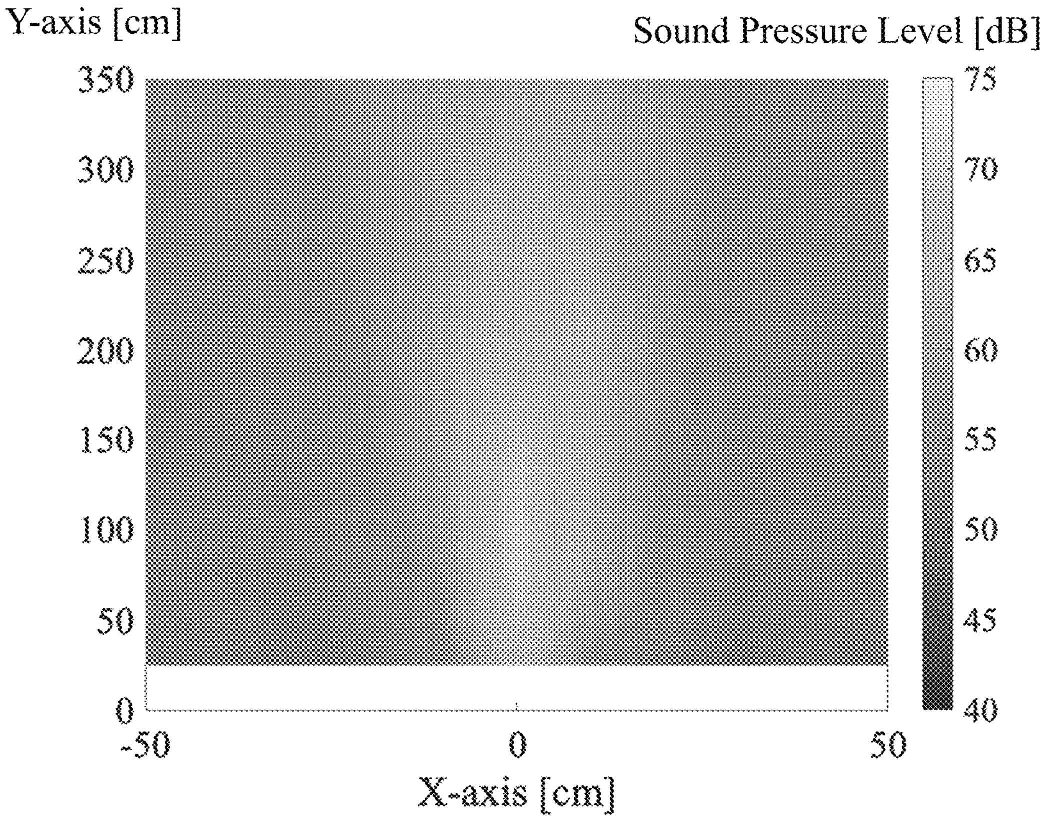
FIG. 5 shows a result under condition 1 in a first experiment in a verification experiment of the parametric array loudspeaker according to the embodiment.
Figure 6:
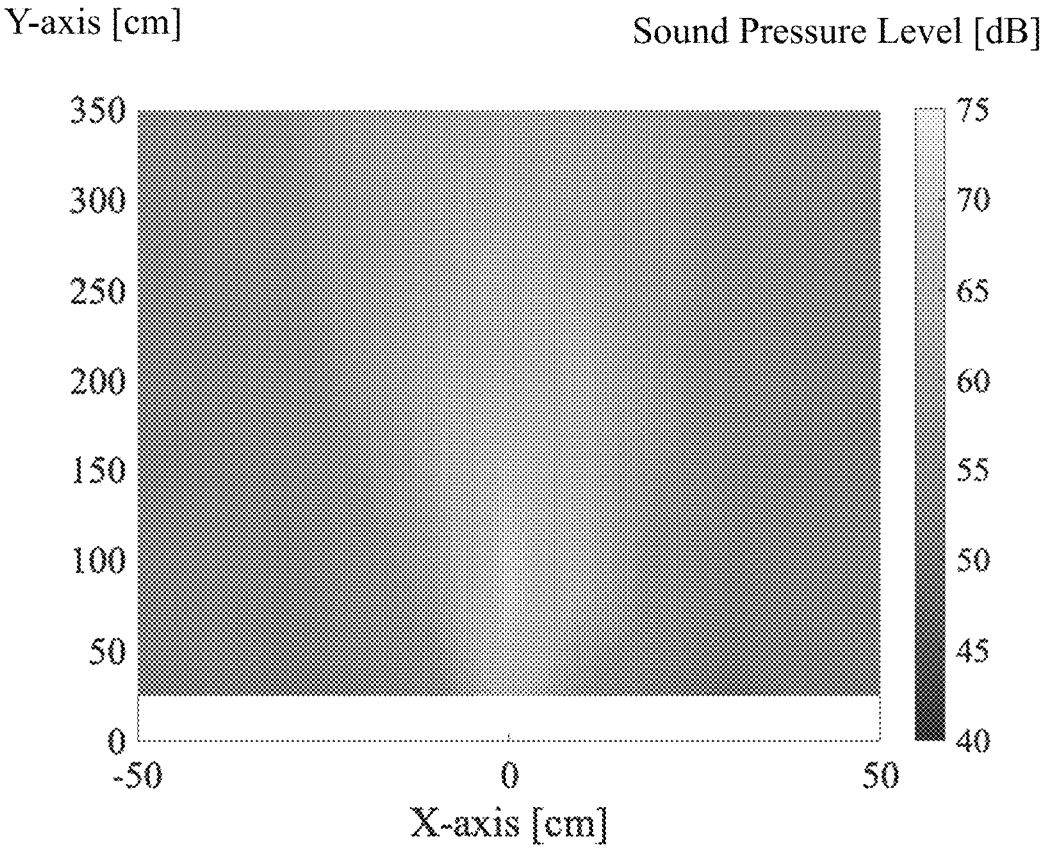
FIG. 6 shows a result under condition 2 in the first experiment in the verification experiment of the parametric array loudspeaker according to the embodiment.
Figure 7:
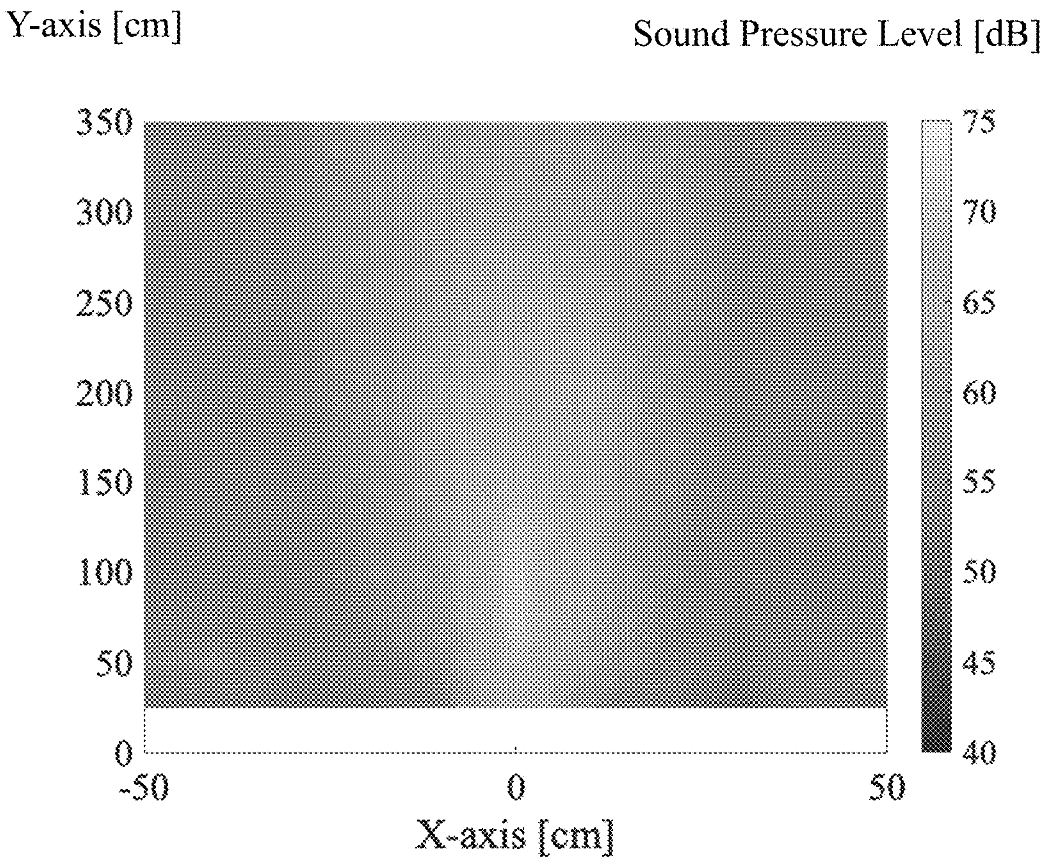
FIG. 7 shows a result under condition 3 in the first experiment in the verification experiment of the parametric array loudspeaker according to the embodiment.
Figure 8:
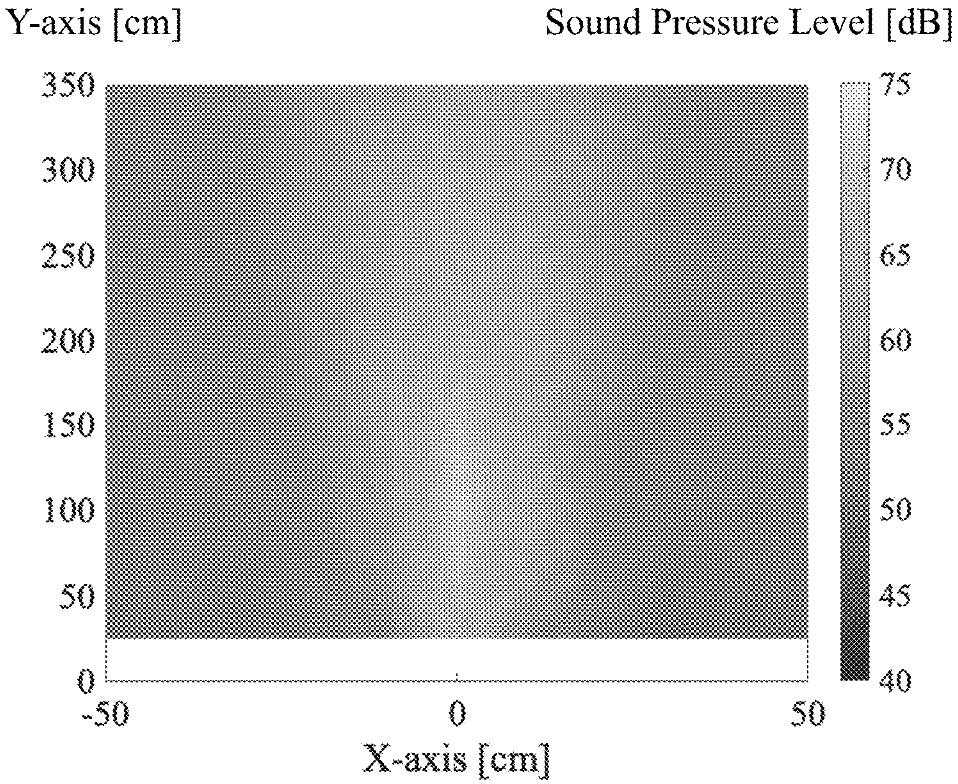
FIG. 8 shows a result under condition 4 in the first experiment in the verification experiment of the parametric array loudspeaker according to the embodiment.
Figure 9:
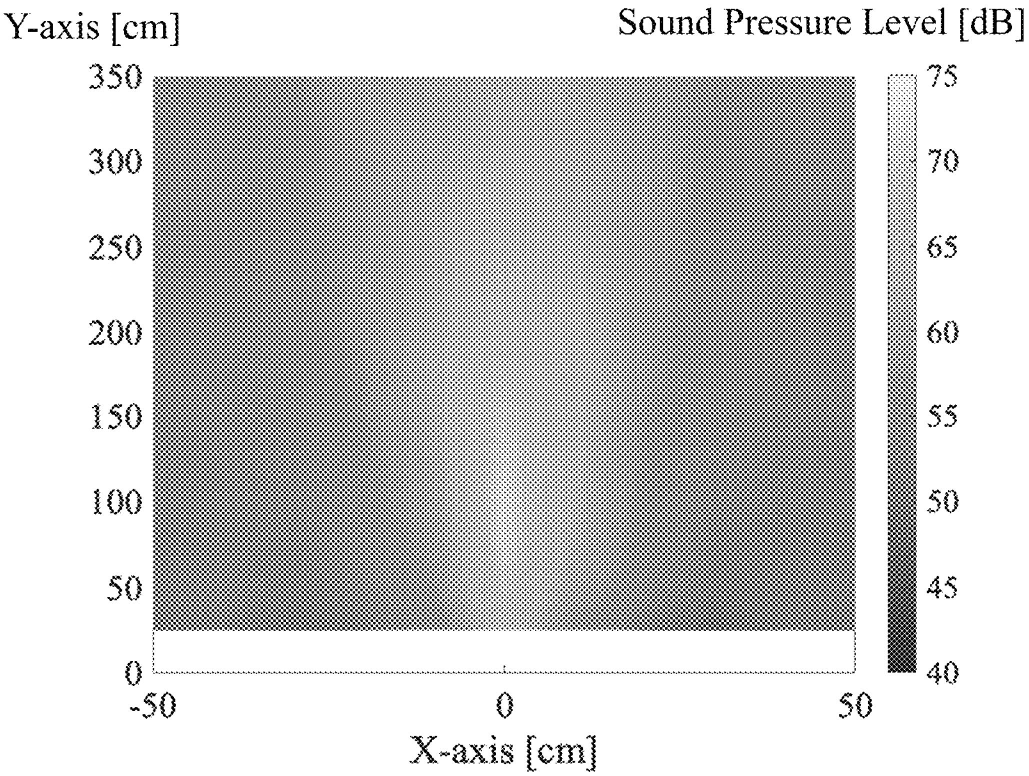
FIG. 9 shows a result under condition 5 in the first experiment in the verification experiment of the parametric array loudspeaker according to the embodiment.
Figure 10:
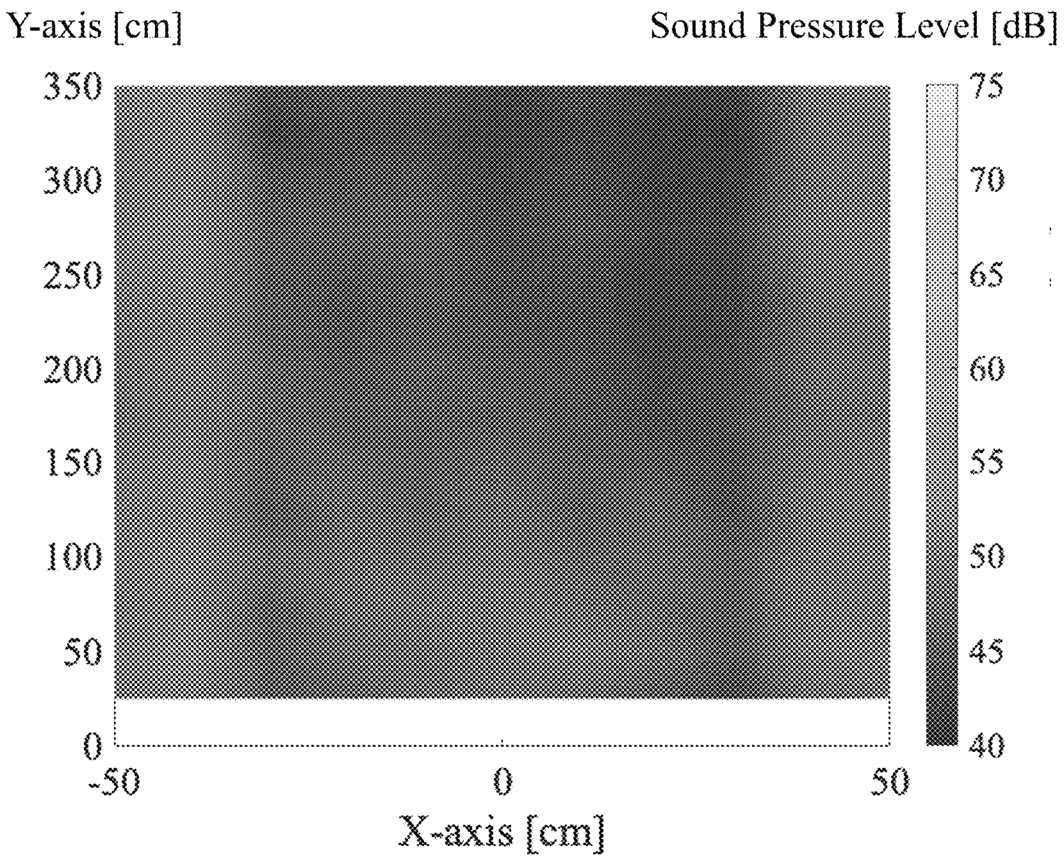
FIG. 10 shows a result under condition 6 in the first experiment in the verification experiment of the parametric array loudspeaker according to the embodiment.

FIG. 5 to FIG. 7 show the measurement results of the sound pressure level under condition 1 to condition 3, respectively, and FIG. 8 to FIG. 10 show the measurement results of the sound pressure level under condition 4 to condition 6, respectively. FIG. 11 shows the measurement results of the directivity angle and the sound pressure attenuation amount under condition 1 to condition 5. In FIG. 5 to FIG. 10, the X-axis represents the first direction R1 (the left-right direction), and the Y-axis represents the second direction R2 (the up-down direction). The X-axis is caused to be aligned with the surface of the loudspeaker body 21, and the position of 0 in the Y-axis and 0 in the X-axis is set at the center in the first direction R1 of the loudspeaker body 21, i.e., the seventh column. Therefore, the larger the value in the Y-axis, the farther from the front face of the loudspeaker body 21 the position is. The larger the value in the Y-axis, the more right the position is, and the smaller the value in the Y-axis, the more left the position is. FIG. 5 to FIG. 11 each show the sound pressure level of audible sound at each position represented by Y-X coordinates.

In a second experiment, the ultrasonic wave generating elements 23 disposed in two columns at each of the left and right of the loudspeaker body 21, i.e., the first and second columns and the 14th and 15th columns, were defined as the first ultrasonic wave generating elements 23A, and the ultrasonic wave generating elements 23 disposed in the third to 13th columns were defined as the second ultrasonic wave generating elements 23B. In that state, the inventor measured the sound pressure level, the directivity angle, and the sound pressure attenuation amount with respect to each of conditions 7 to 9 below.

Condition 7: the first modulation signal SG1 is a signal ($v_M$1($t$) of formula (6)) in which the phase of the carrier wave of the second modulation signal SG2 is inverted and the phase of the sideband wave thereof is not changed.

Condition 8: the first modulation signal SG1 is a signal ($v_M$2($t$) of formula (7)) in which the phase of the sideband wave of the second modulation signal SG2 is inverted and the phase of the carrier wave thereof is not changed.

Condition 9: the first modulation signal SG1 is a signal ($v_M$3($t$) of formula (8)) in which the phases of both of the sideband wave and the carrier wave of the second modulation signal SG2 are inverted.

In addition, as a comparative experiment, the inventor performed an experiment in which, by using the same parametric array loudspeaker 12, only the second modulation signal SG2 in which the phases of neither the carrier wave nor the sideband wave were changed was outputted, and the inventor measured the sound pressure level, the directivity angle, and the sound pressure attenuation amount also with respect to each of condition 9 to condition 12 below.

Condition 10: the second modulation signal SG2 is used as the modulation signal for all of the first ultrasonic wave generating elements 23A and the second ultrasonic wave generating elements 23B.

Condition 11: the second modulation signal SG2 is used only for the second ultrasonic wave generating elements 23B.

Condition 12: the second modulation signal SG2 is used only for the first ultrasonic wave generating elements 23A.

Figure 12:
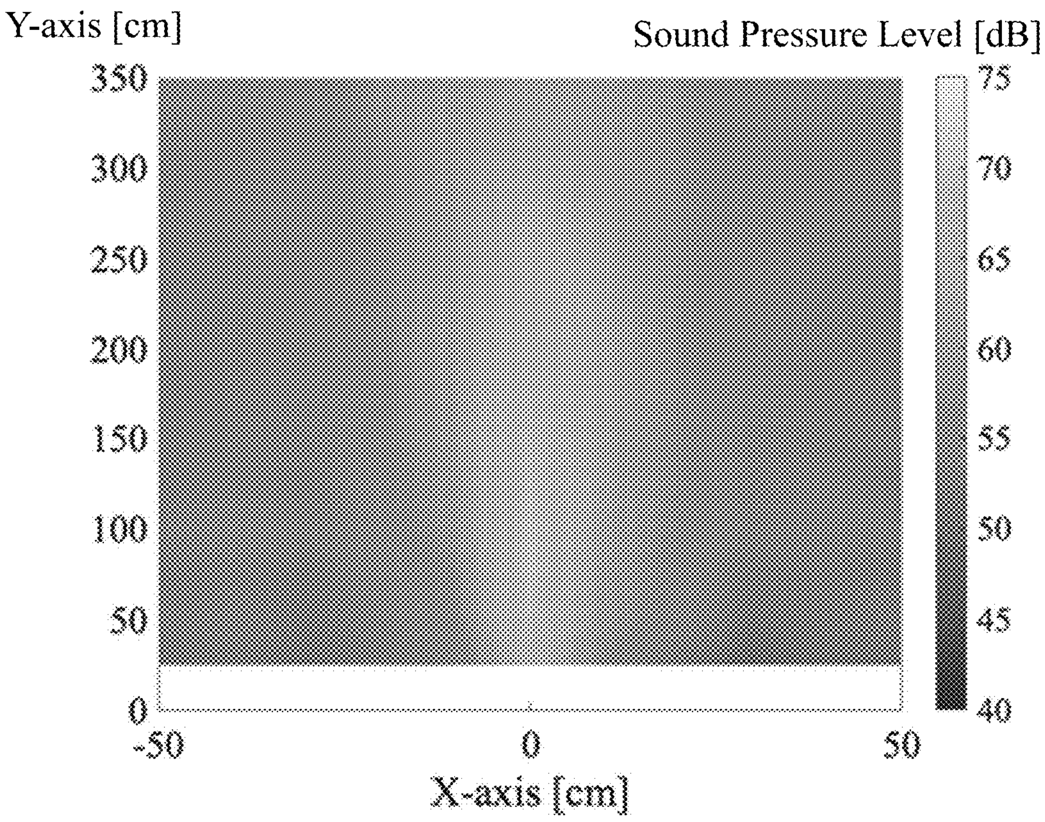
FIG. 12 shows a result under condition 7 in a second experiment in the verification experiment of the parametric array loudspeaker according to the embodiment.
Figure 13:
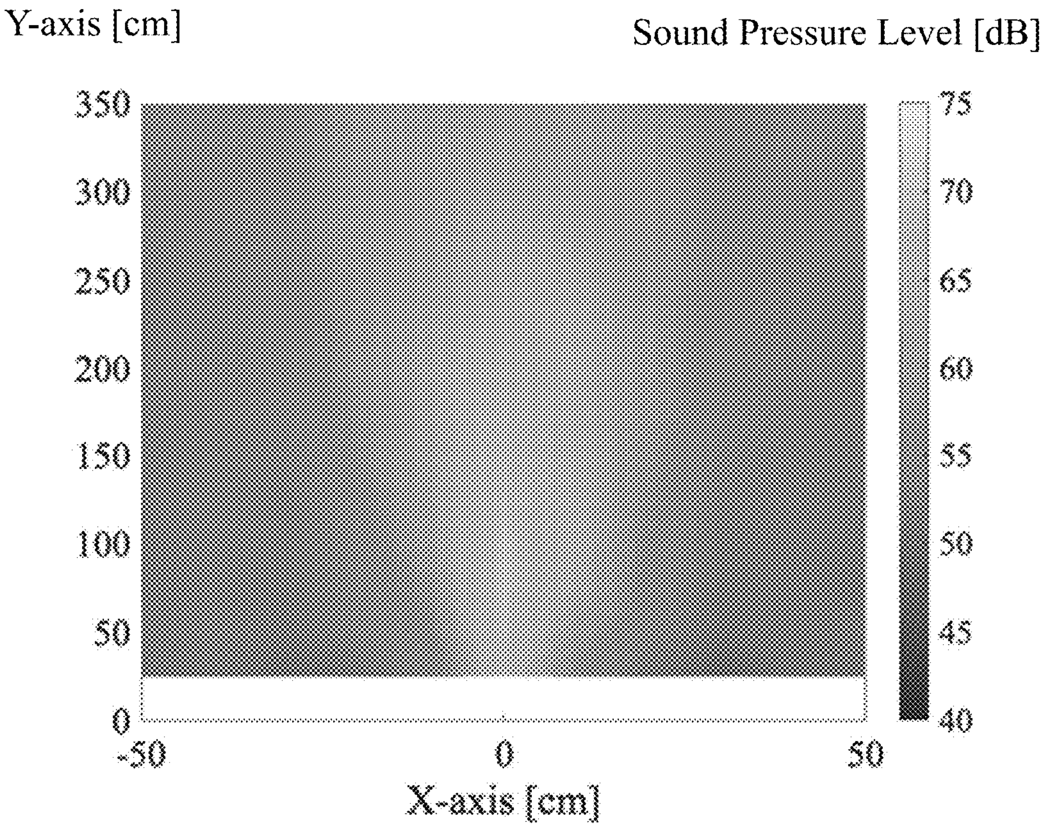
FIG. 13 shows a result under condition 8 in the second experiment in the verification experiment of the parametric array loudspeaker according to the embodiment.
Figure 14:
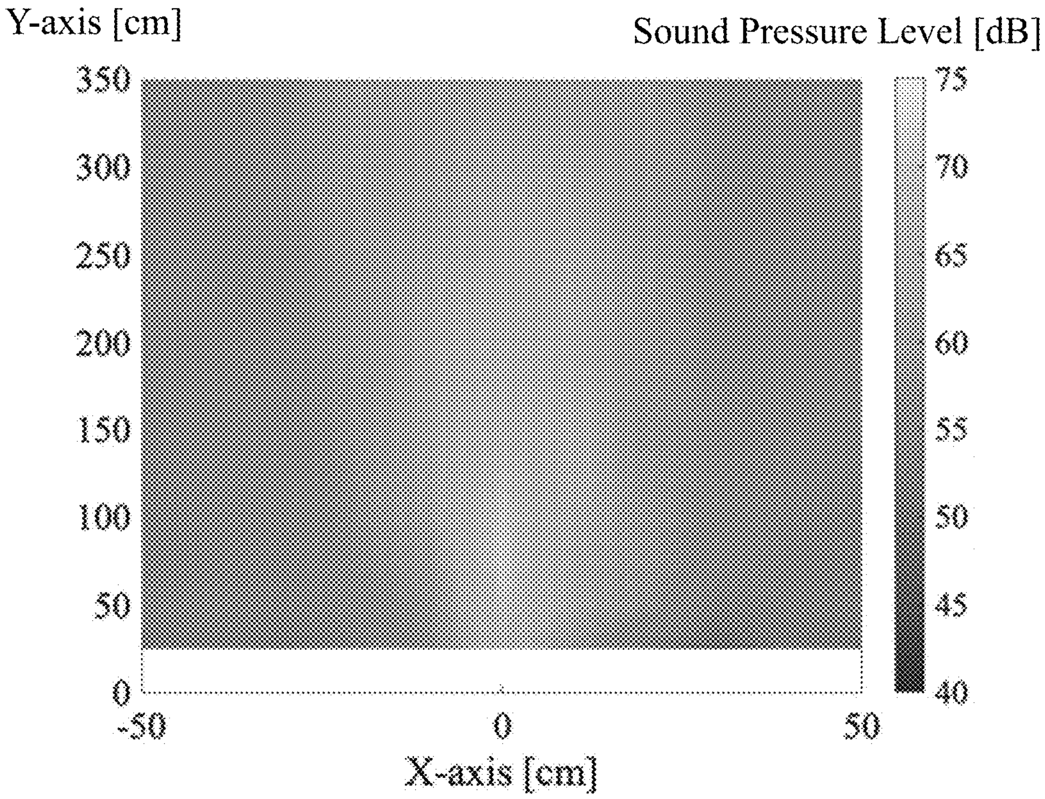
FIG. 14 shows a result under condition 9 in the second experiment in the verification experiment of the parametric array loudspeaker according to the embodiment.
Figure 15:
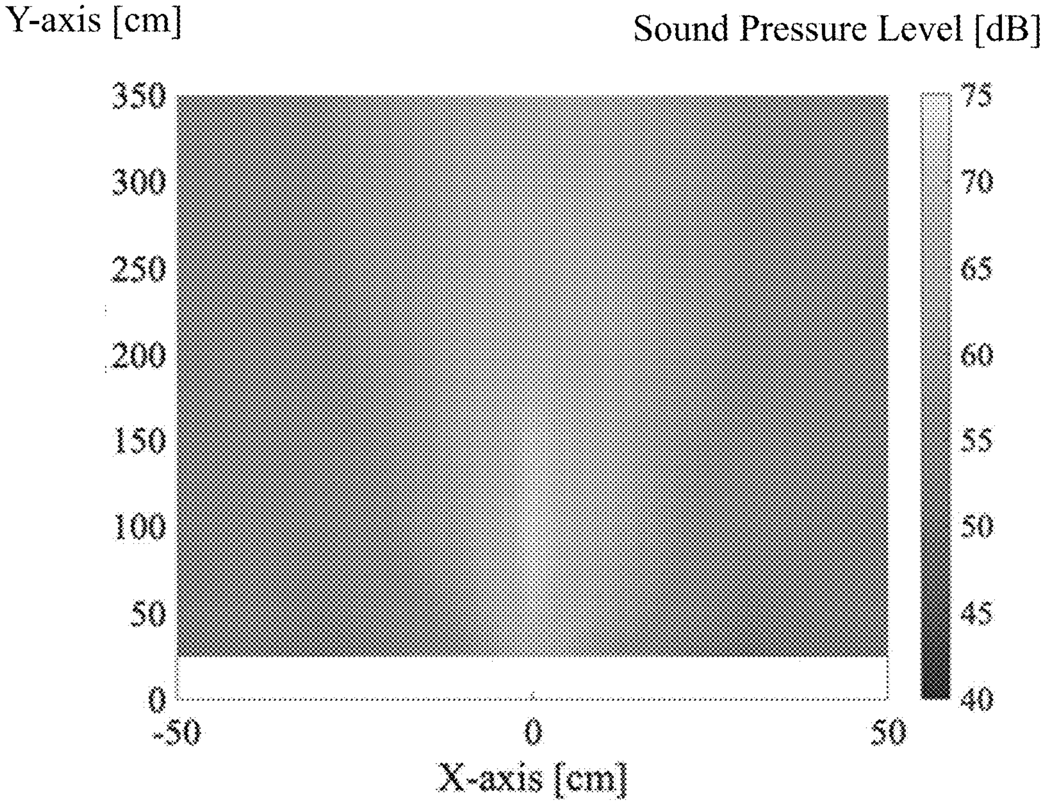
FIG. 15 shows a result under condition 10 in the second experiment in the verification experiment of the parametric array loudspeaker according to the embodiment.
Figure 16:
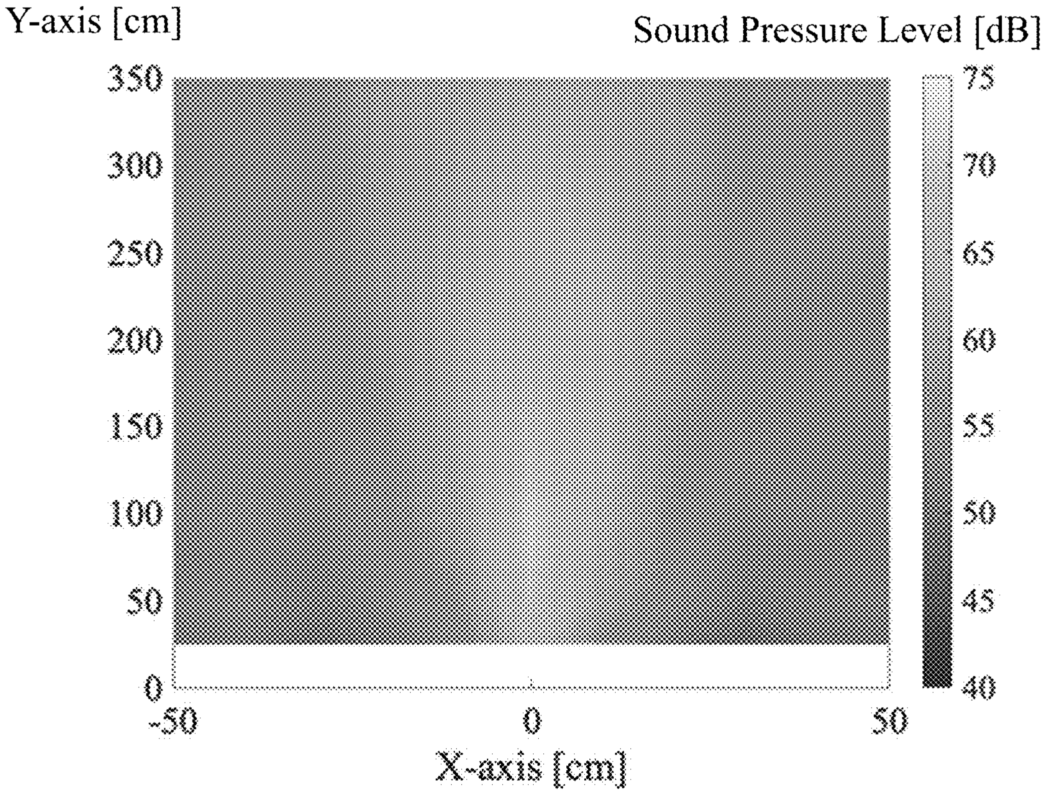
FIG. 16 shows a result under condition 11 in the second experiment in the verification experiment of the parametric array loudspeaker according to the embodiment.
Figure 17:
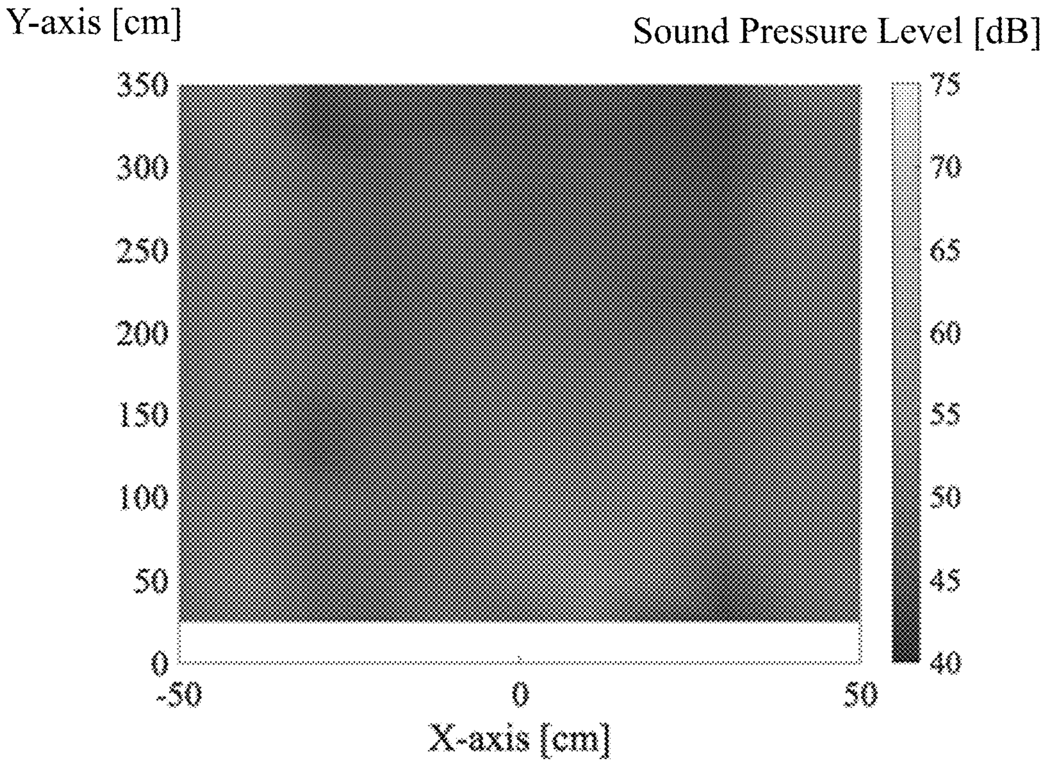
FIG. 17 shows a result under condition 12 in the second experiment in the verification experiment of the parametric array loudspeaker according to the embodiment.

FIG. 12 to FIG. 14 show the measurement results of the sound pressure level under condition 7 to condition 9, respectively, and FIG. 15 to FIG. 17 show the measurement results of the sound pressure level under condition 10 to condition 12, respectively. FIG. 18 shows the measurement results of the directivity angle and the sound pressure attenuation amount under condition 7 to condition 11.

In a third experiment, the ultrasonic wave generating elements 23 disposed in three columns at each of the left and right of the loudspeaker body 21, i.e., the first, second, and third columns and the 13th, 14th, and 15th columns, were defined as the first ultrasonic wave generating elements 23A, and the ultrasonic wave generating elements 23 disposed in the fourth to 12th columns were defined as the second ultrasonic wave generating elements 23B. In that state, the inventor measured the sound pressure level, the directivity angle, and the sound pressure attenuation amount with respect to each of conditions 13 to 15 below.

Condition 13: the first modulation signal SG1 is a signal ($v_M$1($t$) of formula (6)) in which the phase of the carrier wave of the second modulation signal SG2 is inverted and the phase of the sideband wave thereof is not changed.

Condition 14: the first modulation signal SG1 is a signal ($v_M$2($t$) of formula (7)) in which the phase of the sideband wave of the second modulation signal SG2 is inverted and the phase of the carrier wave thereof is not changed.

Condition 15: the first modulation signal SG1 is a signal ($v_M$3($t$) of formula (8)) in which the phases of both of the sideband wave and the carrier wave of the second modulation signal SG2 are inverted.

In addition, as a comparative experiment, the inventor performed an experiment in which, by using the same parametric array loudspeaker 12, only the second modulation signal SG2 in which the phases of neither the carrier wave nor the sideband wave were changed was outputted, and the inventor measured the sound pressure level, the directivity angle, and the sound pressure attenuation amount also with respect to each of condition 16 to condition 18 below.

Condition 16: the second modulation signal SG2 is used as the modulation signal for all of the first ultrasonic wave generating elements 23A and the second ultrasonic wave generating elements 23B.

Condition 17: the second modulation signal SG2 is used only for the second ultrasonic wave generating elements 23B.

Condition 18: the second modulation signal SG2 is used only for the first ultrasonic wave generating elements 23A.

Figure 19:
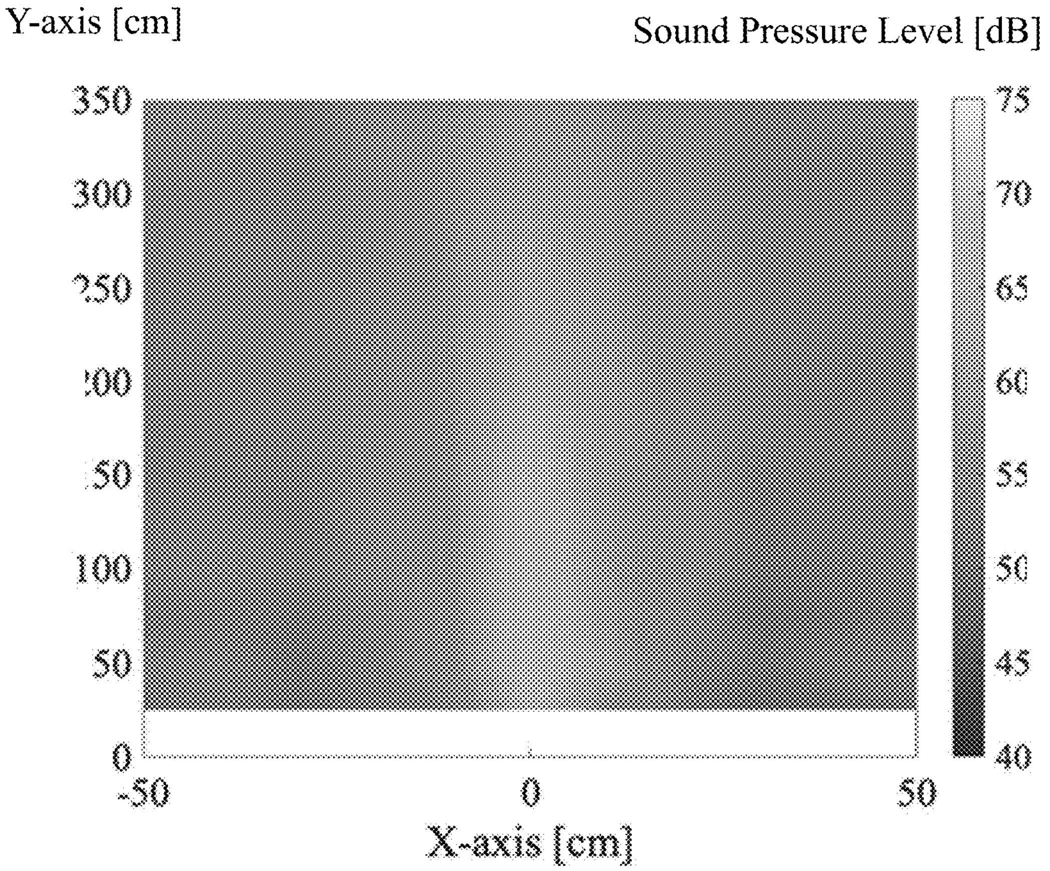
FIG. 19 shows a result under condition 13 in a third experiment in the verification experiment of the parametric array loudspeaker according to the embodiment.
Figure 20:
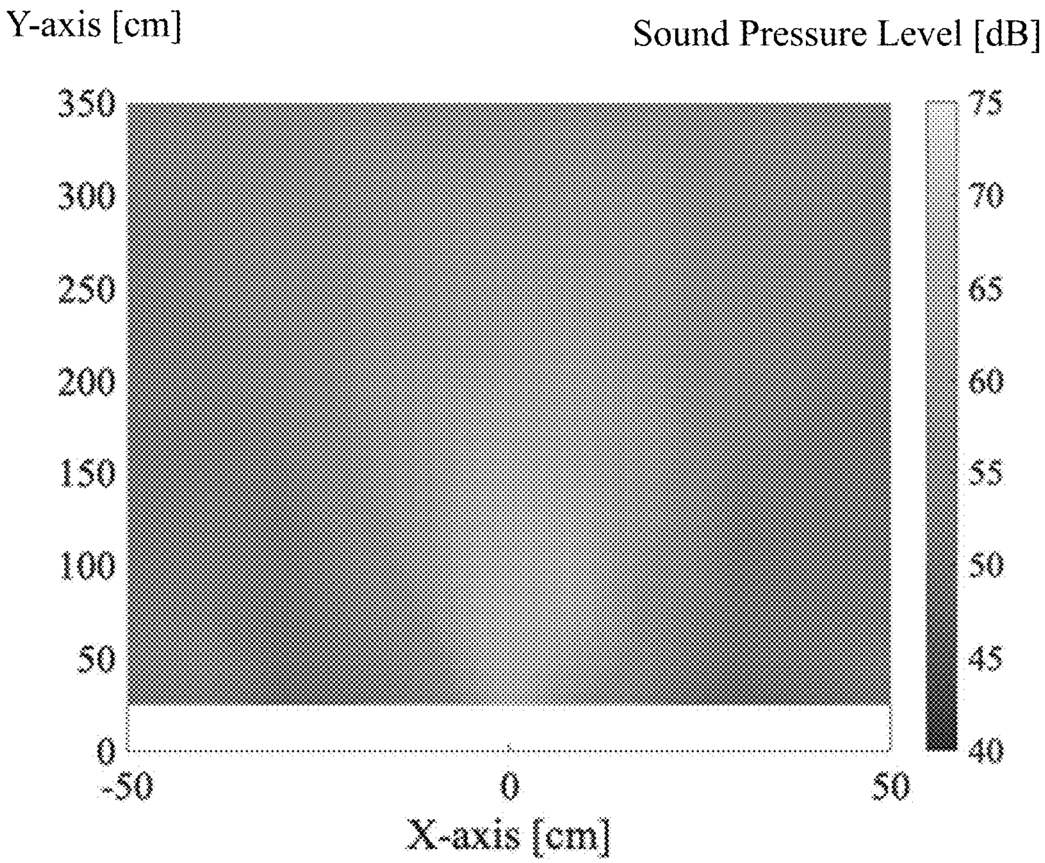
FIG. 20 shows a result under condition 14 in the third experiment in the verification experiment of the parametric array loudspeaker according to the embodiment.
Figure 21:
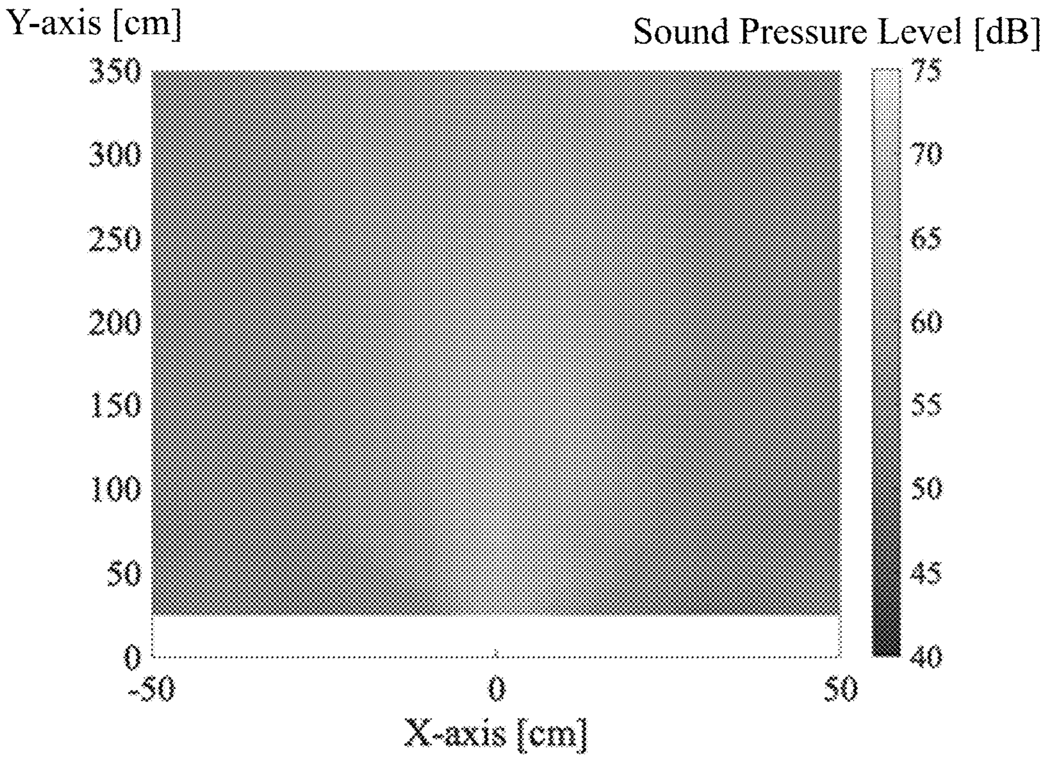
FIG. 21 shows a result under condition 15 in the third experiment in the verification experiment of the parametric array loudspeaker according to the embodiment.
Figure 22:
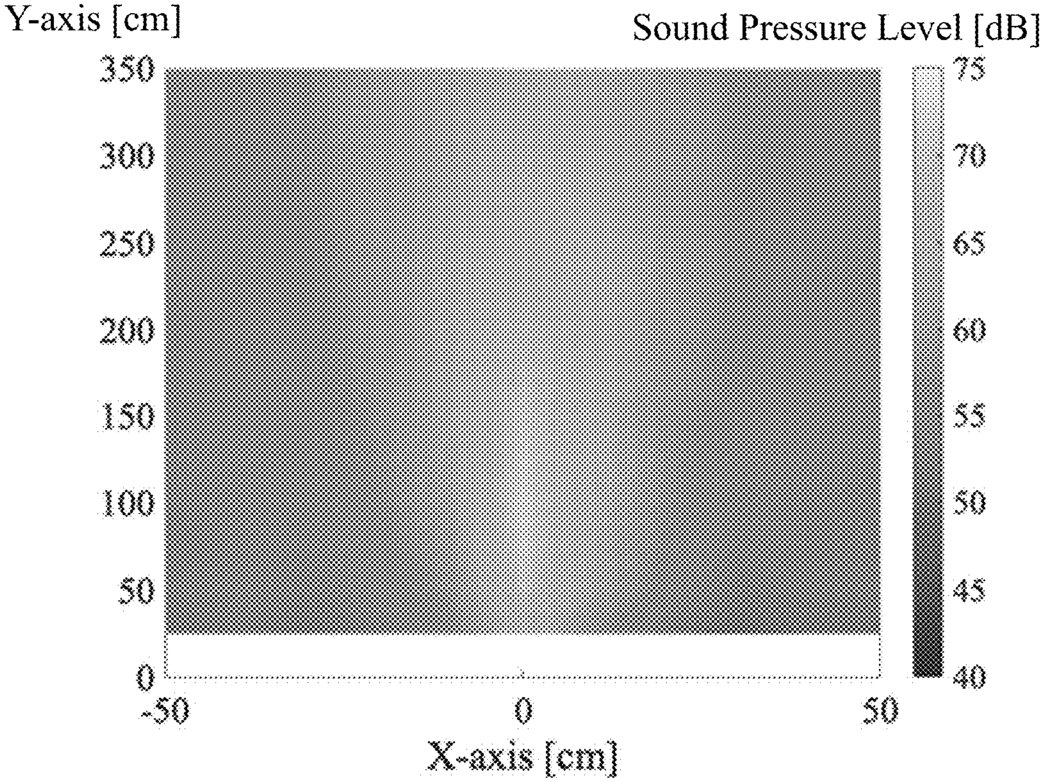
FIG. 22 shows a result under condition 16 in the third experiment in the verification experiment of the parametric array loudspeaker according to the embodiment.
Figure 23:
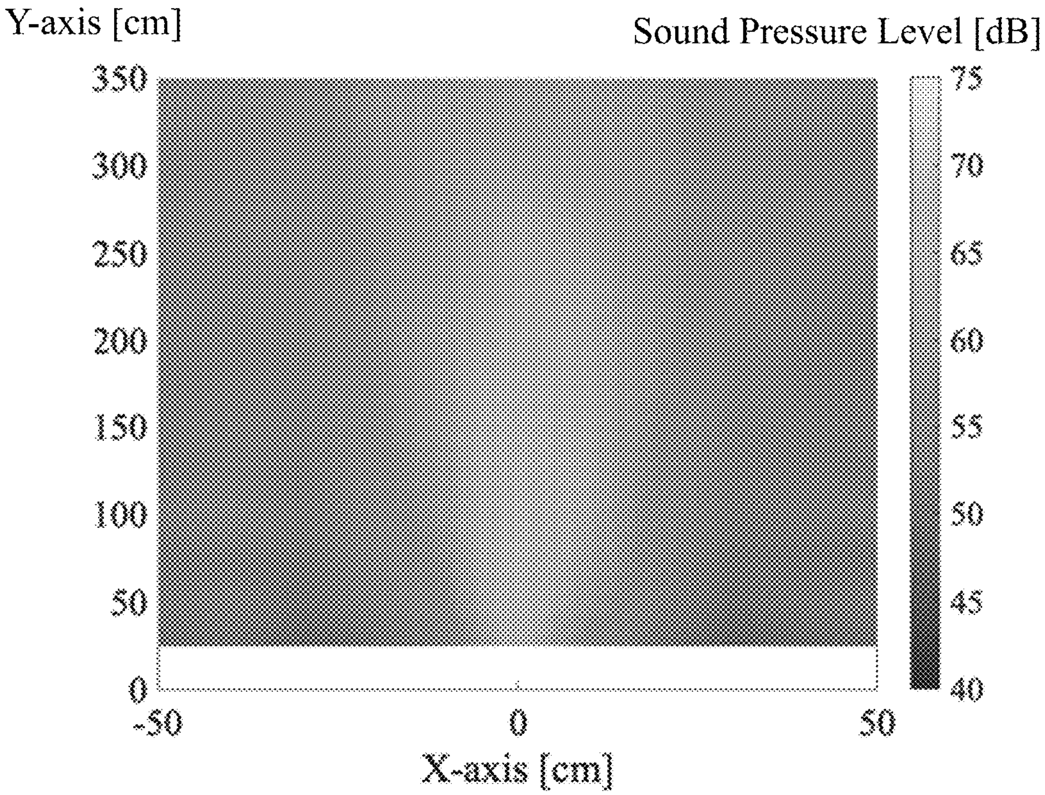
FIG. 23 shows a result under condition 17 in the third experiment in the verification experiment of the parametric array loudspeaker according to the embodiment.
Figure 24:
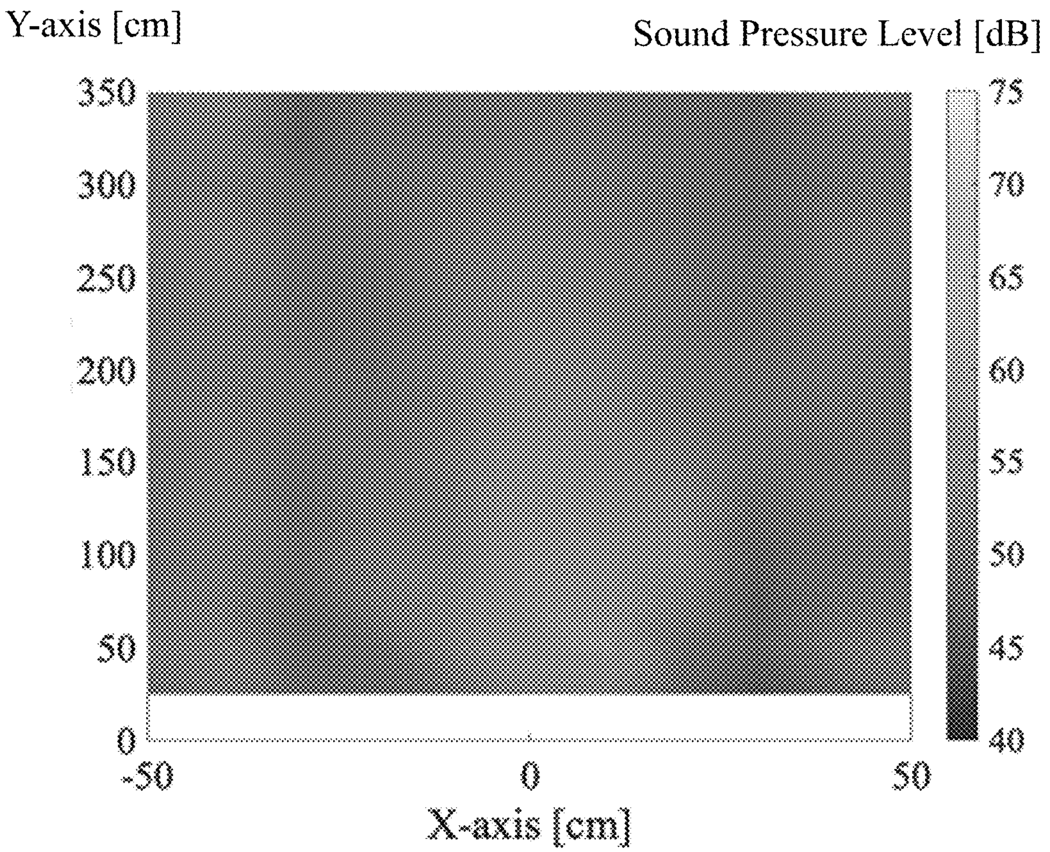
FIG. 24 shows a result under condition 18 in the third experiment in the verification experiment of the parametric array loudspeaker according to the embodiment.

FIG. 19 to FIG. 21 show the measurement results of the sound pressure level under condition 13 to condition 15, respectively, and FIG. 22 to FIG. 24 show the measurement results of the sound pressure level under condition 16 to condition 18, respectively. FIG. 23 shows the measurement results of the directivity angle and the sound pressure attenuation amount under condition 13 to condition 17.

In the first experiment to the third experiment, in the cases of conditions 6, 12, 18, which was performed for comparison and in which the modulated wave based on the second modulation signal SG2 was emitted only at both ends at the left and right, FIG. 10, FIG. 17, and FIG. 24 reveal that the sound pressure level is extremely low at any position with respect to the loudspeaker body 21. Therefore, it was considered that an effective audible area cannot be obtained under conditions 6, 12, 18. Therefore, with respect to these conditions, measurement of the directivity angle and the sound pressure attenuation amount was not performed.

In the first experiment, when the sound pressure level under condition 1 and the sound pressure level under condition 4 are compared, FIG. 5 and FIG. 8 reveal that the width in the first direction R1 (the X-axis direction) of the audible area is smaller under condition 1 than under condition 4. Similarly, when the condition 7 and condition 10 in the second experiment are compared, and condition 13 and condition 16 in the third experiment are compared, FIG. 12 and FIG. 15, and FIG. 19 and FIG. 12 reveal that the width in the first direction R1 of the audible area is smaller than under condition 7 than under condition 10, and the width in the first direction R1 of the audible area is smaller under condition 13 than under condition 16.

This is also shown from the fact that, in any of the measurement results (FIG. 11, FIG. 18, FIG. 25) of the directivity angle in the first experiment to the third experiment, with respect to both of the directivity angle at 1 m and the directivity angle at 2 m under condition 1 and condition 4, condition 7 and condition 10, and condition 13 and condition 16, the values are smaller under conditions 1, 7, 13 than under conditions 4, 10, 16.

Therefore, the following has been verified. That is, when, with respect to the ultrasonic wave generating elements 23 at both ends in the first direction R1, the modulated wave in which the phase of the carrier wave thereof is inverted is radiated, the width in the first direction R1 of the audible area can be made smaller than when the modulated wave in which the phase of the carrier wave thereof is not inverted is radiated from all of the ultrasonic wave generating elements 23. That is, it has been verified that, when the phase of the carrier wave of the modulated wave to be radiated from the ultrasonic wave generating elements 23 at both ends in the first direction R1 is inverted, sound can be delivered sharply and in a narrow manner with respect to the first direction R1.

Here, when the measurement results of the directivity angle under conditions 1, 7, 13 are compared with the measurement results of the directivity angle under conditions 5, 11, 17, FIG. 11, FIG. 18, and FIG. 25 reveal that the directivity angles under conditions 1, 7, 13 are smaller than the directivity angles under conditions 5, 11, 17. This tendency is remarkably observed when the distance from the loudspeaker body 21 is farther. The phase of the carrier wave of the modulated wave radiated from the first ultrasonic wave generating elements 23A and the phase of the carrier wave of the modulated wave radiated from the second ultrasonic wave generating elements 23B are inverted. Therefore, the reason is considered to be the fact that, in the vicinity of the boundary between the modulated wave radiated from the first ultrasonic wave generating elements 23A and the modulated wave radiated from the second ultrasonic wave generating elements 23B, the respective radiation waves cancel each other.

Thus, the first modulation signal SG1 may be a signal in which the phase of the carrier wave of the second modulation signal SG2 is shifted by a predetermined phase shift amount, and the predetermined phase shift amount only needs to be larger than 0. A shift amount that causes inversion of the phase is preferred. Thus, it is considered that, in the vicinity of the boundary between the modulated wave radiated from the first ultrasonic wave generating elements 23A and the modulated wave radiated from the second ultrasonic wave generating elements 23B, the respective radiation waves cancel each other more, whereby the width in the first direction R1 of the audible area can be made smaller.

When the measurement results of the directivity angle under respective conditions 1, 7, 13 are compared, FIG. 11, FIG. 18, and FIG. 25 reveal that the directivity angle is smaller under condition 7 than under condition 1, and the directivity angle is smaller under condition 13 than under condition 7. Thus, it has been verified that, with respect to the ultrasonic wave generating elements 23 at both ends in the first direction R1, in the case of two columns rather than one column and three columns rather than two columns at each of both ends at the left and right, sound can be delivered more sharply and in a narrower manner with respect to the first direction R1.

Therefore, it has been verified that, in order to narrow the width in the first direction R1 of the audible area, it is effective to invert the phase of the carrier wave of the modulated wave with respect to the ultrasonic wave generating elements 23 in at least one column at both ends in the first direction R1 of the loudspeaker body 21, preferably, in columns having the number of about 20% of the total number of the ultrasonic wave generating elements 23 arranged in the first direction R1 of the loudspeaker body 21.

Next, when the sound pressure levels under conditions 2, 8, 14 are compared with the sound pressure levels under conditions 4, 10, 13, FIG. 6 and FIG. 8, FIG. 13 and FIG. 15, and FIG. 20 and FIG. 22 reveal that the length in the second direction R2 (the Y-axis direction) of the audible area is larger under conditions 2, 8, 14 than under conditions 4, 10, 13.

When the measurement results (FIG. 11, FIG. 18, FIG. 25) of the sound pressure attenuation amount in the first experiment to the third experiment are compared, the 0.5-to-2.5 m sound pressure attenuation amount is larger under condition 2, 8, 14 than under condition 4, 10, 16, whereas the 0.5-to-3.5 m sound pressure attenuation amount is smaller under condition 2, 8, 14 than under condition 4, 10, 16. Therefore, it has been found that, when the distance from the loudspeaker body 21 is increased, the sound pressure is more attenuated in condition 2, 8, 14, accordingly.

When the measurement results of the sound pressure attenuation amount under the respective conditions 2, 8, 14 are compared, FIG. 11, FIG. 18 and FIG. 25 reveal that both of the 0.5-to-2.5 m sound pressure attenuation amount and the 0.5-to-3.5 m sound pressure attenuation amount are larger under condition 8 than under condition 2, and both of the 0.5-to-2.5 m sound pressure attenuation amount and the 0.5-to-3.5 m sound pressure attenuation amount are larger under condition 14 than under condition 8.

The reason for this is considered to be the fact that the number of the second ultrasonic wave generating elements 23B is smaller under conditions 2, 8, 14 than under conditions 4, 10, 16, i.e., the number of the ultrasonic wave generating elements 23 that radiate the modulated wave of the second modulation signal SG2 is smaller.

Thus, the first modulation signal SG1 may be a signal in which the phase of the sideband wave of the second modulation signal SG2 is shifted by a predetermined phase shift amount, and the predetermined phase shift amount only needs to be larger than 0. A shift amount that causes inversion of the phase is preferred. Thus, it is considered that the number of the ultrasonic wave generating elements 23 that radiate the modulated wave of the second modulation signal SG2 can be more reduced, and the length in the second direction R2 of the audible area can be made smaller.

Therefore, the following has been verified. That is, when, with respect to the ultrasonic wave generating elements 23 at both ends in the first direction R1 of the loudspeaker body 21, the modulated wave in which the phase of the sideband wave thereof is inverted is radiated, the length in the second direction R2 of the audible area can be made smaller than when the modulated wave in which the phase of the sideband wave thereof is not inverted is radiated from all of the ultrasonic wave generating elements 23. That is, it has been verified that, when the phase of the sideband wave of the modulated wave to be radiated from the ultrasonic wave generating elements 23 at both ends in the first direction R1 is inverted, sound can be delivered to a short distance with respect to the second direction R2.

When the measurement results of the directivity angle under condition 8 and condition 9 are compared, and the measurement results of the directivity angle under condition 14 and condition 15 are compared, it was found that the directivity angle is smaller under condition 9 than under condition 8, and smaller under condition 15 than under condition 14. Therefore, the following has been verified. That is, when, with respect to the ultrasonic wave generating elements 23 at both ends in the first direction R1 of the loudspeaker body 21, the phase of the sideband wave of the modulated wave is inverted to reduce the length in the second direction R2 of the audible area, if further, with respect to the ultrasonic wave generating elements 23 at both ends in the first direction R1, the phase of the carrier wave of the modulated wave is inverted, sound can be delivered more sharply and in a narrower manner with respect to the first direction R1.

In the description above, with respect to the ultrasonic wave generating elements 23 at both ends in the first direction R1 of the loudspeaker body 21, the phase of at least one of the carrier wave and the sideband wave of the modulated wave is shifted (inverted) by a predetermined phase shift amount. However, also with respect to the second direction R2, similarly, with respect to the ultrasonic wave generating elements 23 at both ends in the second direction R2, the phase of at least one of the carrier wave and the sideband wave of the modulated wave may be shifted by a predetermined phase shift amount. It has been verified that, in the results of the above experiments, when the first direction R1 and the second direction R2 are switched with each other also with respect to the second direction R2, the range in which audible sound is delivered can be changed in a similar manner. Further, it is considered that the range in which audible sound is delivered can be changed if, in both of the first direction R1 and the second direction R2, with respect to the ultrasonic wave generating element 23 at both ends, the phase of at least one of the carrier wave and the sideband wave of the modulated wave is shifted by a predetermined phase shift amount.

The present invention is not limited to the above embodiment, and can be modified in various manners.

REFERENCE SIGNS LIST

10 acoustic sound system
11 signal generation device
12 parametric array loudspeaker
13 signal source
14 filter processing unit
21 loudspeaker body
22 signal processing unit
23 ultrasonic wave generating element
23A first ultrasonic wave generating element
23B second ultrasonic wave generating element
24 support substrate
31 carrier wave generation unit
32 modulation unit
33 phase adjustment unit
34 phase control unit
35 amplification unit
A1 first area
A2 second area
R1 first direction
R2 second direction
SG1 first modulation signal
SG2 second modulation signal

The invention claimed is:

1. A parametric array loudspeaker comprising:

a plurality of ultrasonic wave generating elements arranged in a first direction; and a modulation circuit configured to generate a modulation signal in which audible sound is modulated with a carrier wave, wherein the plurality of ultrasonic wave generating elements include a first ultrasonic wave generating element included in a first area being at least one side of both end areas in the first direction, and a second ultrasonic wave generating element included in a second area present between the both end areas, the modulation circuit generates a first modulation signal to be provided to the first ultrasonic wave generating element, and a second modulation signal to be provided to the second ultrasonic wave generating element, and the first modulation signal is a signal in which a phase of at least one of the carrier wave and a sideband wave of the second modulation signal is shifted by a predetermined phase shift amount.

2. The parametric array loudspeaker according to claim 1, wherein generating the second modulation signal by the modulation circuit includes inverting the phase of the carrier wave of the first modulation signal, and not changing the phase of the sideband wave.

3. The parametric array loudspeaker according to claim 1, wherein generating the second modulation signal by the modulation circuit includes inverting the phase of the sideband wave of the first modulation signal and not changing the phase of the carrier wave.

4. The parametric array loudspeaker according to claim 1, wherein generating the second modulation signal by the modulation circuit includes inverting the phases of both of the sideband wave and the carrier wave of the first modulation signal.

5. A signal processing device to be used in a parametric array loudspeaker including a plurality of ultrasonic wave generating elements arranged in a first direction, the signal processing device being configured to generate a modulation signal in which audible sound is modulated with a carrier wave, the signal processing device being configured to:

generate a first modulation signal to be provided to a first ultrasonic wave generating element, out of the plurality of ultrasonic wave generating elements, that is included in a first area being at least one side of both end areas in the first direction; and generate a second modulation signal to be provided to a second ultrasonic wave generating element included in a second area present between the both end areas, wherein the first modulation signal is a signal in which a phase of at least one of the carrier wave and a sideband wave of the second modulation signal is shifted by a predetermined phase shift amount.

6. A signal processing method to be performed in a parametric array loudspeaker including a plurality of ultrasonic wave generating elements arranged in a first direction, the signal processing method being for generating a modulation signal in which audible sound is modulated with a carrier wave, the signal processing method comprising:

generating a first modulation signal to be provided to a first ultrasonic wave generating element, out of the plurality of ultrasonic wave generating elements, that is included in a first area being at least one side of both end areas in the first direction; and generating a second modulation signal to be provided to a second ultrasonic wave generating element included in a second area present between the both end areas, wherein the first modulation signal is a signal in which a phase of at least one of the carrier wave and a sideband wave of the second modulation signal is shifted by a predetermined phase shift amount.

* * * * *